United States Patent [19]

Beadle et al.

[11] 4,225,918
[45] Sep. 30, 1980

[54] SYSTEM FOR ENTERING INFORMATION INTO AND TAKING IT FROM A COMPUTER FROM A REMOTE LOCATION

[75] Inventors: Bruce R. Beadle; John P. Conners; Michael E. Larson, Fond du Lac, all of Wis.

[73] Assignee: Giddings & Lewis, Inc., Fond du Lac, Wis.

[21] Appl. No.: 775,986

[22] Filed: Mar. 9, 1977

[51] Int. Cl.² .......................... G06F 3/04; G06F 11/00
[52] U.S. Cl. ..................................................... 364/200
[58] Field of Search ... 364/200 MS File, 900 MS File; 179/2 DP; 235/302, 304, 304.1; 340/146.1 R, 146.1 C; 324/73 R, 73 AT

[56] References Cited

U.S. PATENT DOCUMENTS

| | | | |
|---|---|---|---|
| 3,535,683 | 10/1970 | Woods et al. | 364/900 |
| 3,585,599 | 6/1971 | Hitt et al. | 364/200 |
| 3,813,531 | 5/1974 | King et al. | 235/304.1 |
| 3,882,305 | 5/1975 | Johnstone | 364/200 X |
| 3,889,062 | 6/1975 | Epstein | 364/200 X |
| 3,909,802 | 9/1975 | Cassarino, Jr. et al. | 364/200 |
| 3,916,177 | 10/1975 | Greenwald | 235/304.1 |
| 3,953,717 | 4/1976 | Rottier et al. | 235/304.1 |
| 3,958,111 | 5/1976 | Hackett | 235/304 X |
| 4,051,326 | 9/1977 | Badagnani et al. | 364/900 X |
| 4,057,847 | 11/1977 | Lowell et al. | 364/200 |
| 4,109,309 | 8/1978 | Johnstone et al. | 364/900 X |

Primary Examiner—Melvin B. Chapnick
Attorney, Agent, or Firm—Leydig, Voit, Osann, Mayer & Holt, Ltd.

[57] ABSTRACT

A system for transmitting binary instruction or data words to or from a computer by control from a home base remote from the computer site, and characterized by the entry of signals into the computer or the extraction of signals from the computer performed by apparatus which directly connects to the computer console manual switches and indicator lights. A single telephone line forming two simultaneously active channels transmitting time-spaced pulses in opposite directions, by modems known in the art, is used as the communication link. A special purpose microcomputer directly connected to the main computer console acts figuratively to actuate the console push buttom switches in response to pulse train signals received from home base and representing single bits or multibit words. It returns to the home base a rapidly iterated and updated pulse train representative of the status of all console lights. The system includes another computer at the home base with a duplicate, reflective console like that of the main computer. The apparatus at the home base computer responds to binary messages to the main computer, due to actuation of the reflective console, with the same effect as if it were bing used and observed at the computer site.

26 Claims, 9 Drawing Figures

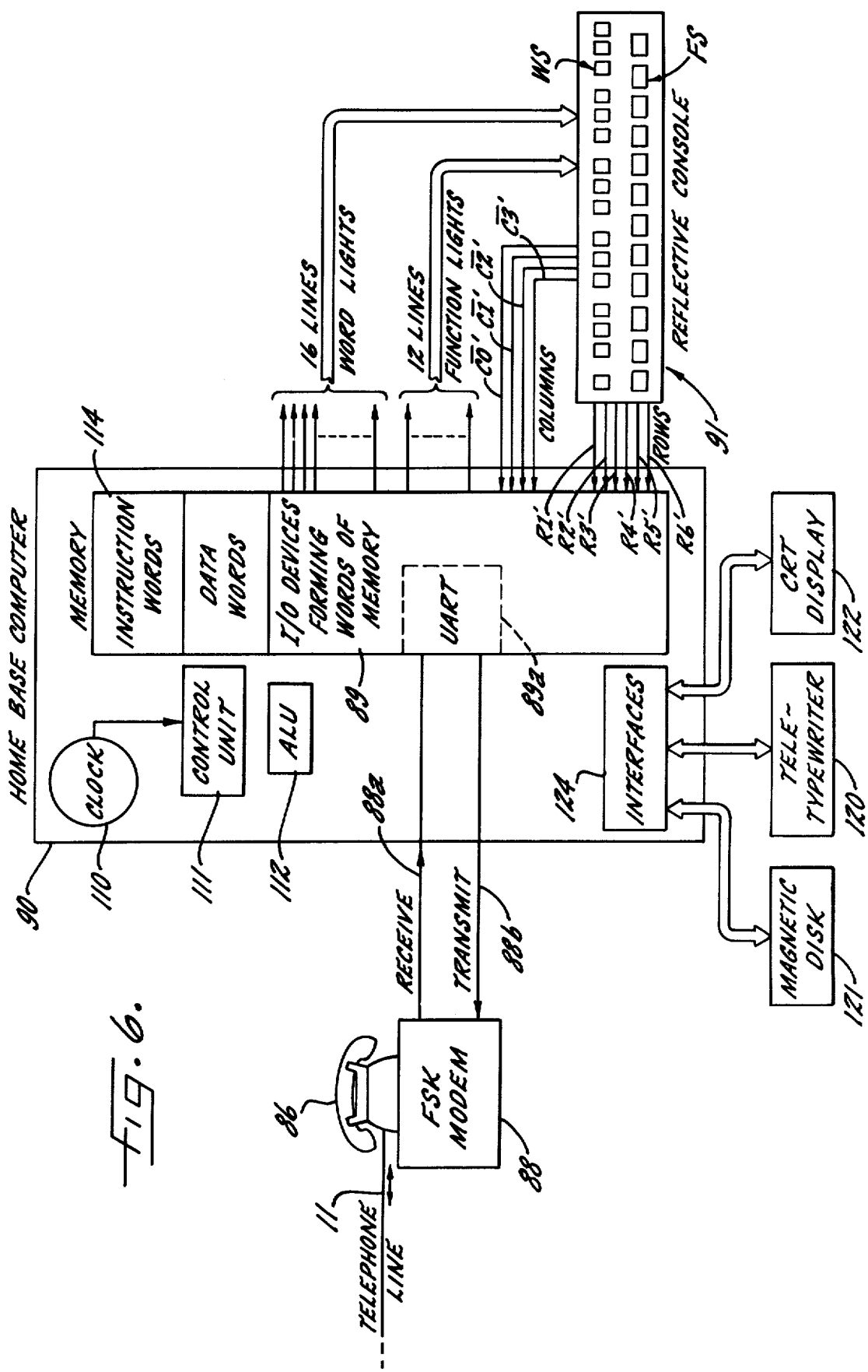

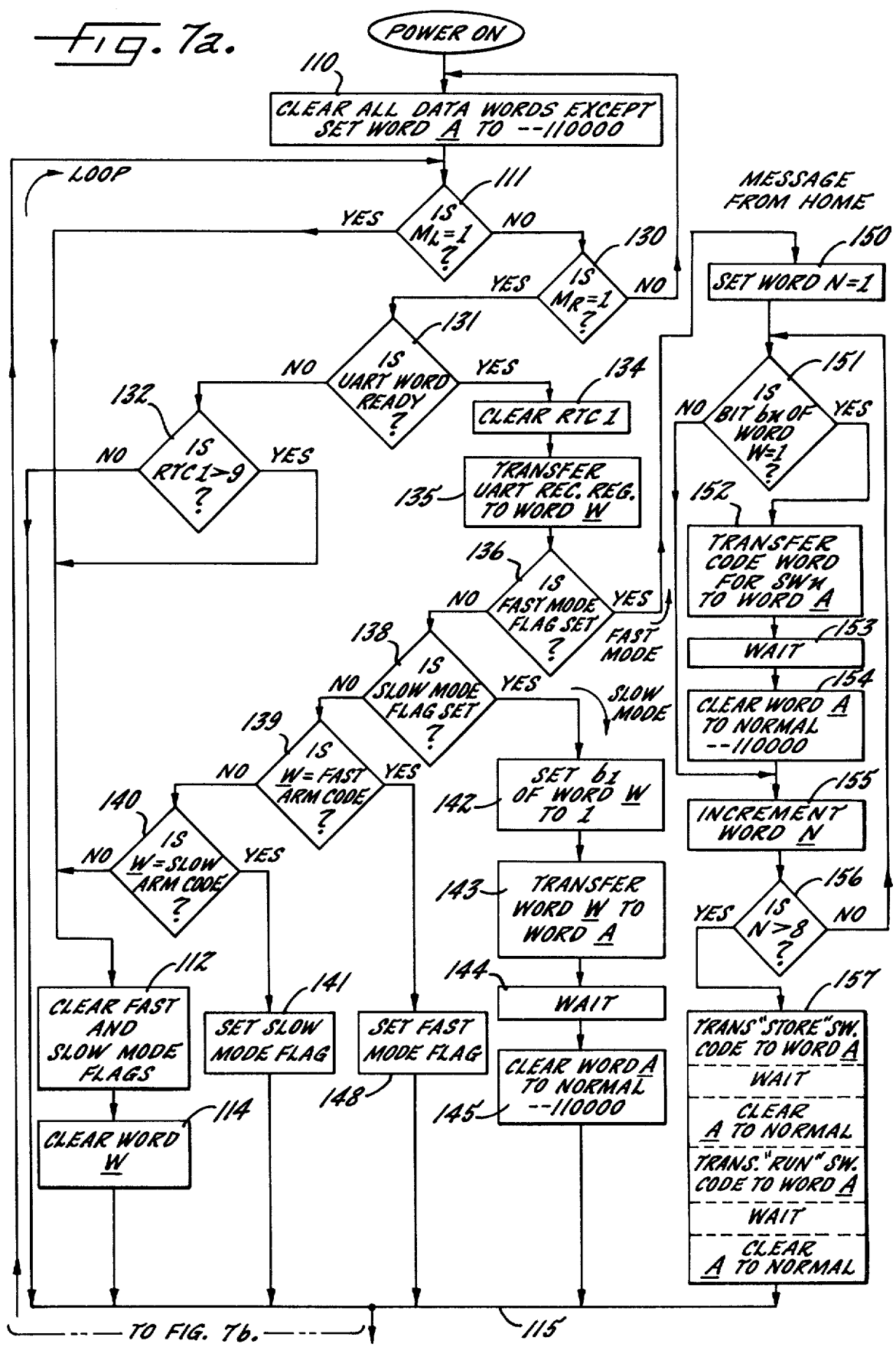

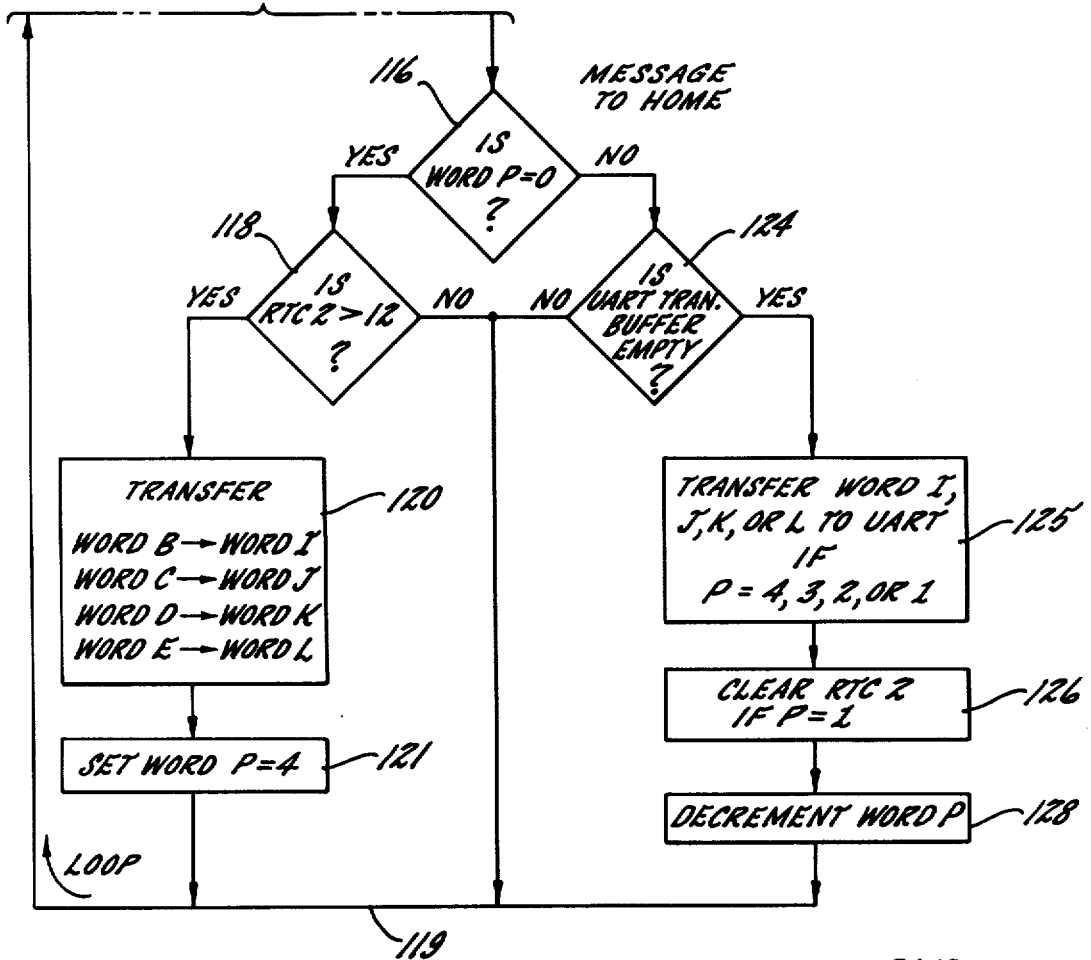
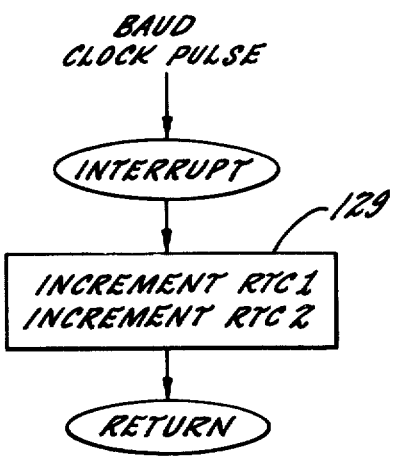
FIG. 7b.

SYSTEM FOR ENTERING INFORMATION INTO AND TAKING IT FROM A COMPUTER FROM A REMOTE LOCATION

BRIEF SUMMARY OF THE INVENTION

The present invention relates in general to digital computer systems and more particularly to such systems in which information (data and/or instruction words) may be transferred between a digital computer and a home base which are separated by considerable distances. Although susceptible of use in a variety of applications, the invention will find special advantages in the diagnosis, from a home base with resident experts, of troubles or malfunctions within a remotely located digital computer.

The concept of communication and transfer of binary data between two computers widely spaced apart is not new. Indeed, "remote diagnostics" by telephone links between a computer in the field and a central facility have been widely practiced in the art of general purpose digital computers. An example of special purpose diagnostic transmission or logging transmission of data between computers via telephone lines is described generally in U.S. Pat. No. 3,882,305. Insofar as known to the present applicants, however, all such prior art systems have required special and relatively complex input/output interface hardware and supporting software to carry data into or out of a computer. Typically, time serialized pulse trains, going by telephone or radio communication link to the computer (or such pulse trains formed at the computer site and sent therefrom over the link) are converted into words signaled as parallel bits (or they are formed from words signaled as parallel bits in the computer)—and such words have been treated as if they were inputs to or outputs from conventional peripheral devices such as a teletypewriter or a tape reader/punch. The binary data words in such cases are usually not in the "machine language" of the computer, and extensive conversion routines are necessary to process and store each word (going in) at a desired memory location, or to take a machine language word (which is to go out) from a specified location and feed it in proper format to the peripheral device terminals. Both processing time and hardware, as well as resident processing programs, are unduly extensive. The prior art systems have accommodated the transmission of whole programs (special diagnostic routines or normal operational programs), or whole sets of resulting data. They leave it awkward and inconvenient, if not impossible, for an expert technician to "manipulate" the computer in question from his distant home base to arrive, by judicious and intuitive trial and error, at a logical and correct conclusion about any experienced malfunction or difficulty.

It is the general aim of this invention to bring forth improved remote control of digital computers, and enhanced transmission of data to a computer from a distant home base or from a computer to the home base—and by a system whose apparatus is less dependent upon the operational status of the computer than systems of the prior art.

A related object of the invention is to achieve economy of hardware and programming required for remote control of a digital computer by supplying data into, and taking data out of, the console which is ordinarily and for other purposes associated with the computer as a standard portion thereof.

Still another object of the invention is to make it possible for an expert at his home base or office, remote from the site of a computer under treatment, to manipulate and observe a "reflective console" at the home base—with the result that his actions, decisions and judgments proceed equally as well and in the same fashion as if he were standing in front of the computer's console. This "reflective console" capability is especially advantageous in those situations where resident interfacing programs for a teletypewriter or tape reader/punch are for some reason inoperative; in such cases the difficulty can be cured without a personal visit by an expert technician to the computer site. Travel of such expert technicians is not only costly but may in some cases involve several days' delay.

A further object of the invention is to provide an efficient system organization for packing serial pulse trains into parallel words or unpacking parallel words into serial pulse trains by the use of a simple micro-computer which can be constructed in a small, portable form and easily hooked into or disconnected from any one of several main computers. This microcomputer, and its de-engageable connection to the main computer console, permits bi-directional communication over a two-channel link with the home base even in the event that the computer in question will not "run" under its own stored programs and will not pack and unpack data or instruction words.

Yet another object is to achieve rapid transmission of multi-word messages (instructions and/or data) from a home base into a computer through the same conductors which receive signals when the computer's console switches are actuated—by rapidly injected coded signals which have the same effect as though such switches were being individually actuated at an extremely rapid rate.

DESCRIPTION OF THE DRAWINGS

These and other objects and advantages of the invention will become apparent from the following detailed description of an exemplary embodiment, taken in conjunction with the accompanying drawings, in which:

FIG. 6 is a more detailed illustration of the home base computer and associated apparatus; and FIGS. 7a and 7b, when joined as indicated, constitute a flow chart setting out the stored operating program for the microcomputer of FIG. 5.

DETAILED DESCRIPTION

While the invention has been shown and will be described in some detail with reference to a particular embodiment thereof, there is no intention that it thus be limited to such detail. On the contrary, it is intended here to cover all modifications, alternatives and equivalents falling within the spirit and scope of the invention as defined by the appended claims.

Figure 1:
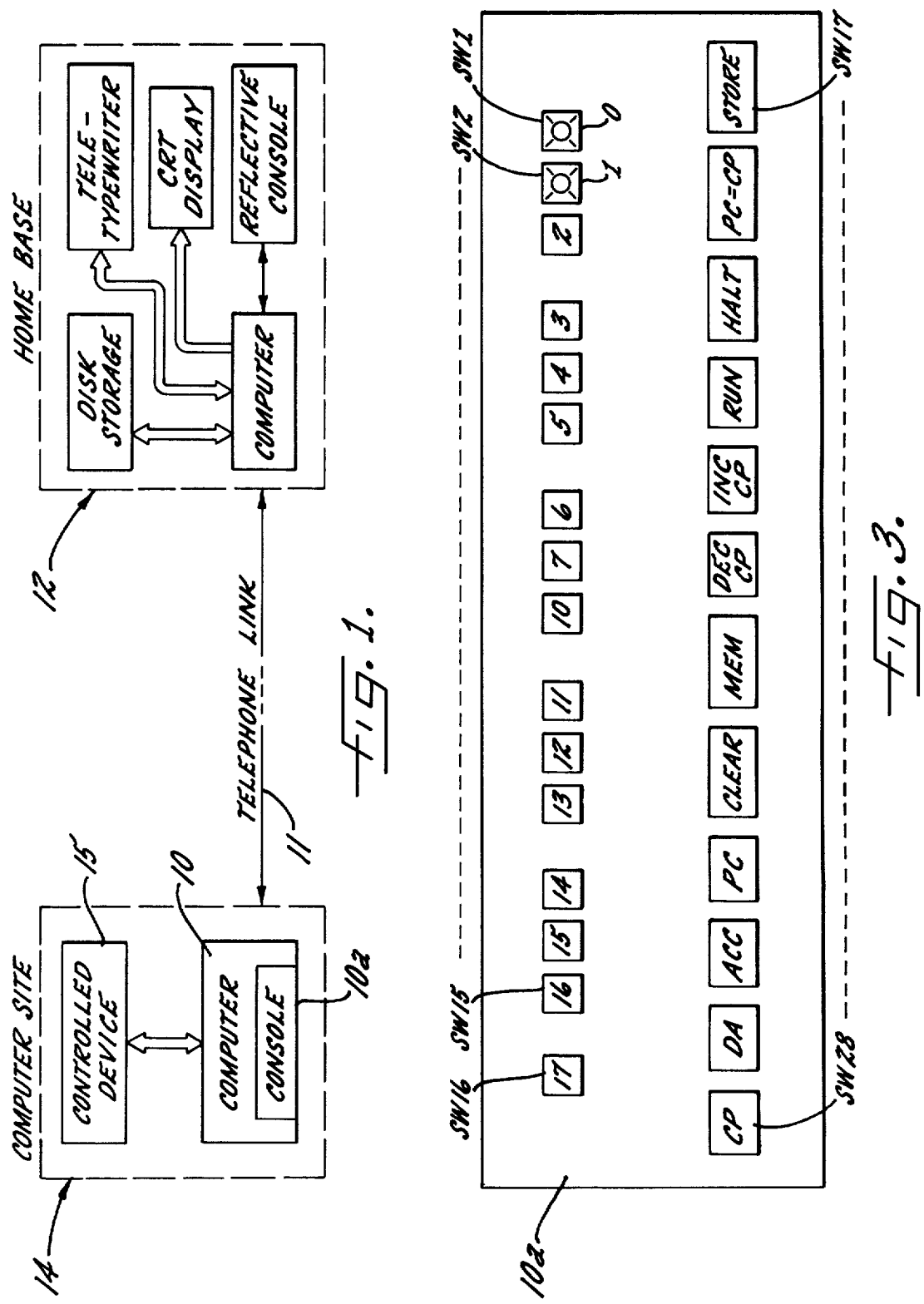
FIG. 1 is a generalized illustration of a computer system embodying the features of the present invention.

FIG. 1 illustrates in broad block diagram form a system in which binary digital signals may be transmitted from a general purpose computer 10 via a communications or telephone link 11 to apparatus at a home base 12; and by which digital information may be transmitted from the home base 12 to the computer 10. For purposes of discussion it will here be assumed that some difficulty exists in one or more components of the computer 10 and that it is desired to diagnose that trouble by transmitting instructions and/or data words from the home base 12 to the computer, and observing or printing out the results for analysis at the home base. As indicated by the dashed lines in the communication link 11, the main computer 10 in question is located at a site 14 which is remote from the home base 12—the degree of separation being anywhere from a few hundred feet to thousands of miles. It is only required, as is known in the art, that the communication link 11 be capable of transmitting time serialized binary bit signals, and for this purpose it has been found that long distance telephone lines are adequate.

For completeness of illustration, FIG. 1 shows the computer 10 as having the usual machine language console 10a associated therewith. This includes a plurality of push button switches and a plurality of display lights so that binary words with the individual bits thereof set in a desired pattern may be fed into the computer by manual manipulation, and so that the contents of various registers or memory locations within the computer may be displayed in the individual machine language bits on the console lights. In many instances, the computer 10 will be connected to sense the condition of and to control a controlled device 15. Merely as an example, that device might be a large machine tool representing a considerable capital investment. Because there may not be readily available at the computer site an experienced and expert computer technician, any malfunction in the computer 10 will render the controlled device inoperative and thus incur costly delays in its productive use. It is important, therefore, that any trouble in the computer 10 be diagnosed and cured as promptly as possible. The system of the present invention is aimed toward such prompt diagnosis and curing through the services of an expert technician at the home base 12, the latter being, for example, the office of the computer manufacturer. By the apparatus and the procedures here to be described, the technician at the home base may put the computer 10 through various tests while in voice communication via a second telephone line with an unskilled repairman at the computer site. Once the technician has determined the likely cause of trouble within the computer 10, it is a simple matter for him to orally instruct the repairman to take appropriate physical corrective measures, e.g., replacement of certain printed circuit boards or components within the computer 10.

Figure 2:
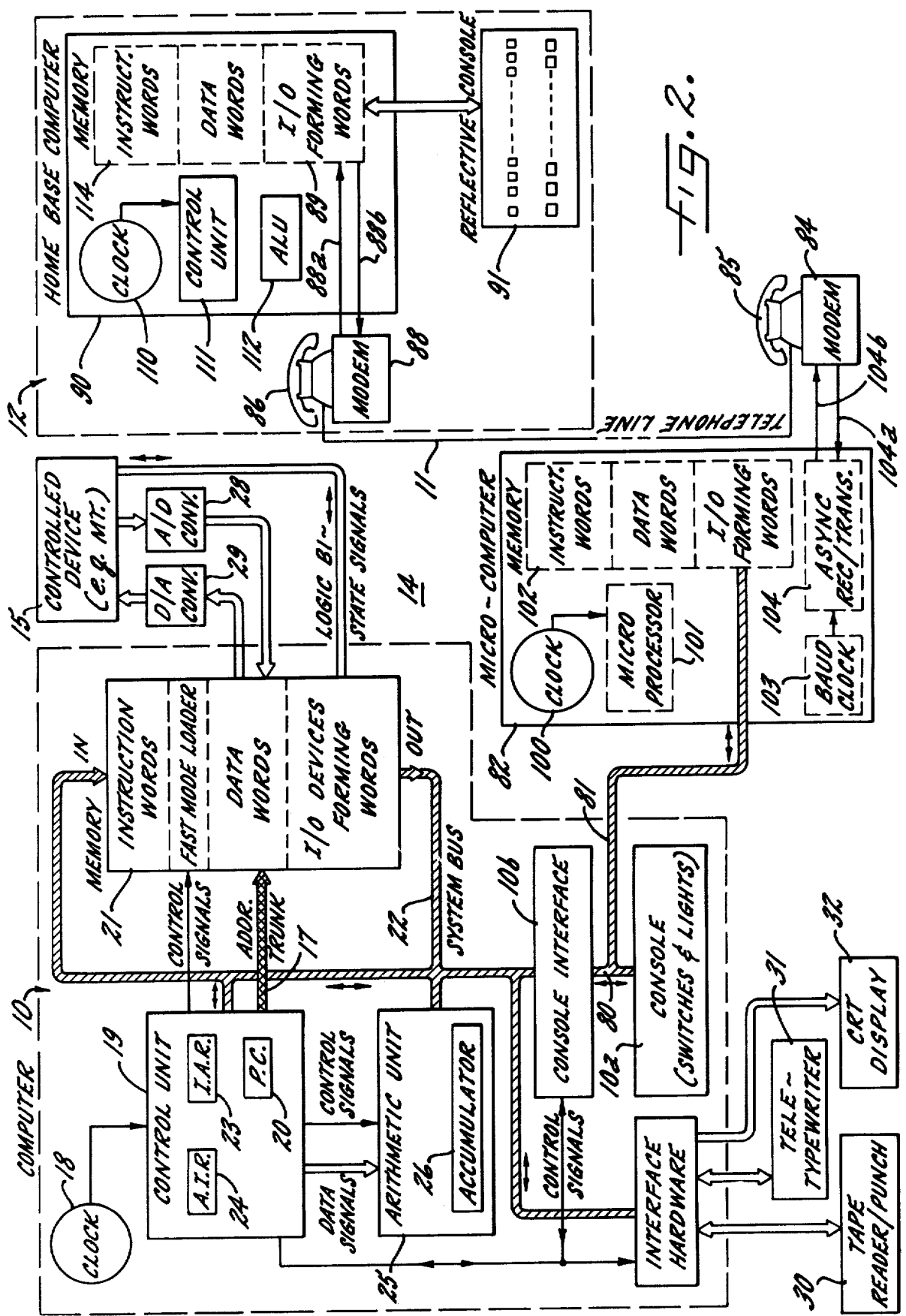
FIG. 2 is a block diagram corresponding to FIG. 1 but illustrating in greater detail the components of apparatus within a general purpose main computer, a microcomputer, a two-channel link, and home base equipment.

The system generally shown in FIG. 1 is also illustrated with somewhat more detail in FIG. 2. The computer 10 is basically of a conventional organization known to those skilled in the art. It is described in the copending U.S. application of John P. Conners, Ser. No. 726,277 filed Sept. 24, 1976, although the Boolean logic and single bit manipulation features there emphasized are omitted from the present FIG. 2 as irrelevant to this case. Briefly stated, the computer 10 includes a clock 18 supplying timing pulses to a control unit 19 which sends control signals to essentially all the other components. As a program counter 20 is advanced, usually one increment at a time, it sends via an address trunk 17 a binary word representing numerically the address of the next one of many instruction words held in a memory unit 21. That instruction, selected by an address number signaled from the program counter 20, is fetched from memory 21 over a common system bus 22 and accepted into an instruction address register (IAR) 23 within the control unit. The operand address portion of the instruction word signaled at the output of register 23 is then used in the control unit to place on the address trunk 17 signals which cause the data word from that address to be placed on the system bus and then gated into an arithmetic input register (AIR) 24. From the latter, the operand is sent to an arithmetic unit 25 with operation signals (e.g., add, subtract) derived in the control unit from the operation code portion of the instruction word signaled at the output of register 23. The results of the operation in the arithmetic unit usually appear in an accumulator 26. The program counter 20 having been incremented, the next instruction brought from memory to the register 23 might typically be "store accumulator output at a specified address". The output of the accumulator 26 is then gated to the system bus 22 and accepted into a particular memory location whose address is represented by the address code portion of the output from register 23 applied to the memory 21 to "open" a corresponding word section.

The foregoing is a very attenuated and simplified description of exemplary operations within the computer 10, and merely serves to confirm that the latter includes as conventional components a clock, control unit, arithmetic unit, memory, system bus and address trunk. As illustrated, the memory 21 includes many instruction words (each at a certain location or address). These instruction words, once loaded into the memory, determine the computer's "program" of operations. In addition, the memory 21 contains many data words (each at a certain location or address) which usually represent changeable numerical values in binary notation. These data words can be pulled out as operands fed to the arithmetic unit, or a data word, newly formed as the result of one or more chained arithmetic or logic operations, may be stored back into specified memory location with a desired value.

In addition, the memory 21 includes input and output devices by which many signals, each having one or the other of bistate levels, are treated as addressable words. Typically, input devices are constituted by switches which are either opened or closed to supply a binary 0 or 1 signal constituting one bit of information. Also typically, output devices are constituted by flip-flops whose output signals are taken through driver amplifiers to turn on or off some electrical devices such as a solenoid valve or warning lights. Each such input/output device forms a single bit of a plural bit word within the memory 21. By fetching a whole word of bistate logic bits from memory onto the system bus and sensing a particular bit therein, the status of any device (switch or flip-flop) may be determined and utilized in logic or arithmetic processing; and by setting or clearing a particular bit within a sixteen bit logic word before storing the latter to a certain memory location, any particular output device controlled by a particular flip-flop may be turned on or off from time to time as the computer's operation so dictates.

If the computer 10 is to be used to govern a complex controlled device 15, such as a machine tool, with servo positioning drives, then the computer 10 may be programmed with instruction words to operate upon "part program data" so as to produce in certain words of the memory 21 command numbers which dynamically change to numerically represent progressively desired positions of movable machine tool members. Such controlling of a machine tool, which is typical of a variety of machines which may be servo-controlled by the computer 10, is commonly called "numerical control". Actual positions of the machine tool members represented by analog signals from sensing devices may be fed through analog-to-digital converters 28 to respective words or addresses in the memory 21. These actual position numbers are then compared subtractively in the computer with the commanded position numbers, on a rapidly repeating basis, to derive and store in certain memory locations numerical values of the position errors. The signals from those latter memory locations are passed through buffers and drivers (not shown) to digital-to-analog converters 29 whose analog or voltage outputs serve as input signals to power servo drives. Because the position errors are kept small, the actual positions of the controlled members of the machine tool keep essentially in agreement with the dynamically changing, numerically signaled commanded positions.

The bits within the input/output words of bistate signals represent either the status of on-off elements (e.g., switches) on the machine tool, or they serve to turn certain machine tool elements (e.g., coolant valves, lights, etc.) on or off. These signals are used by the computer, or controlled by the computer, as it rapidly iterates through its program of instructions.

Any general purpose computer may have peripheral units associated therewith. Merely as examples, a tape reader/punch 30, a teletype typewriter 31, and a CRT display 32 are shown (although neither any nor all are necessarily used) in FIG. 2. They are illustrated here to confirm that, if used, each requires a considerable amount of "support" in the form of hardware interface equipment and a considerable number of steps of program instructions.

Remote control (inputting of words) and monitoring (outputting of words) of a computer has been practiced in the prior art by telephone hook-ups to the inputs into and the outputs from teletype or reader/punch interfaces, if they are present (but this often is not the case). The software support required is a material burden on both the instruction memory capacity of the computer and the rapidity with which it can cycle through or repeat its complete program.

The Console and Its Operation

As noted earlier herein, the computer 10 includes a switch and light expert's machine language console 10a. It is provided so that instruction or data words may be manually entered into desired locations (registers or memory addresses) within the computer, and so that the contents of various registers and memory locations may be displayed and observed. The console 10a operates completely in machine language (e.g., straight binary for numerical data words and in machine codes for instruction words). It is thus associated with a console interface 10b which may be of relatively simple hardware organization and which communicates with the remainder of the computer via the system bus 22 while receiving control signals from, and sending them to, the control unit 19. The console 10a and its interface 10b are rarely used by an operator of the computer; he usually lacks knowledge of the machine language, and he puts data into the computer by a punched tape or an alpha numeric keyboard. But the console 10a is a powerful tool usable by an expert computer technician for initial checkout of the computer or for making various diagnostic tests to find and correct malfunctioning components. But such a skilled technician may be hundreds or thousands of miles from the computer site when the computer is first installed or later develops perplexing symptoms and faults. A "down" computer may remain down for a considerable period of time, and be beyond the skill of an ordinary electrician or repairman for curing, until an expert technician can travel to the computer site—often at considerable travel expense—to make good use of the console 10a in solving the malfunction or operating difficulty.

Figure 3:
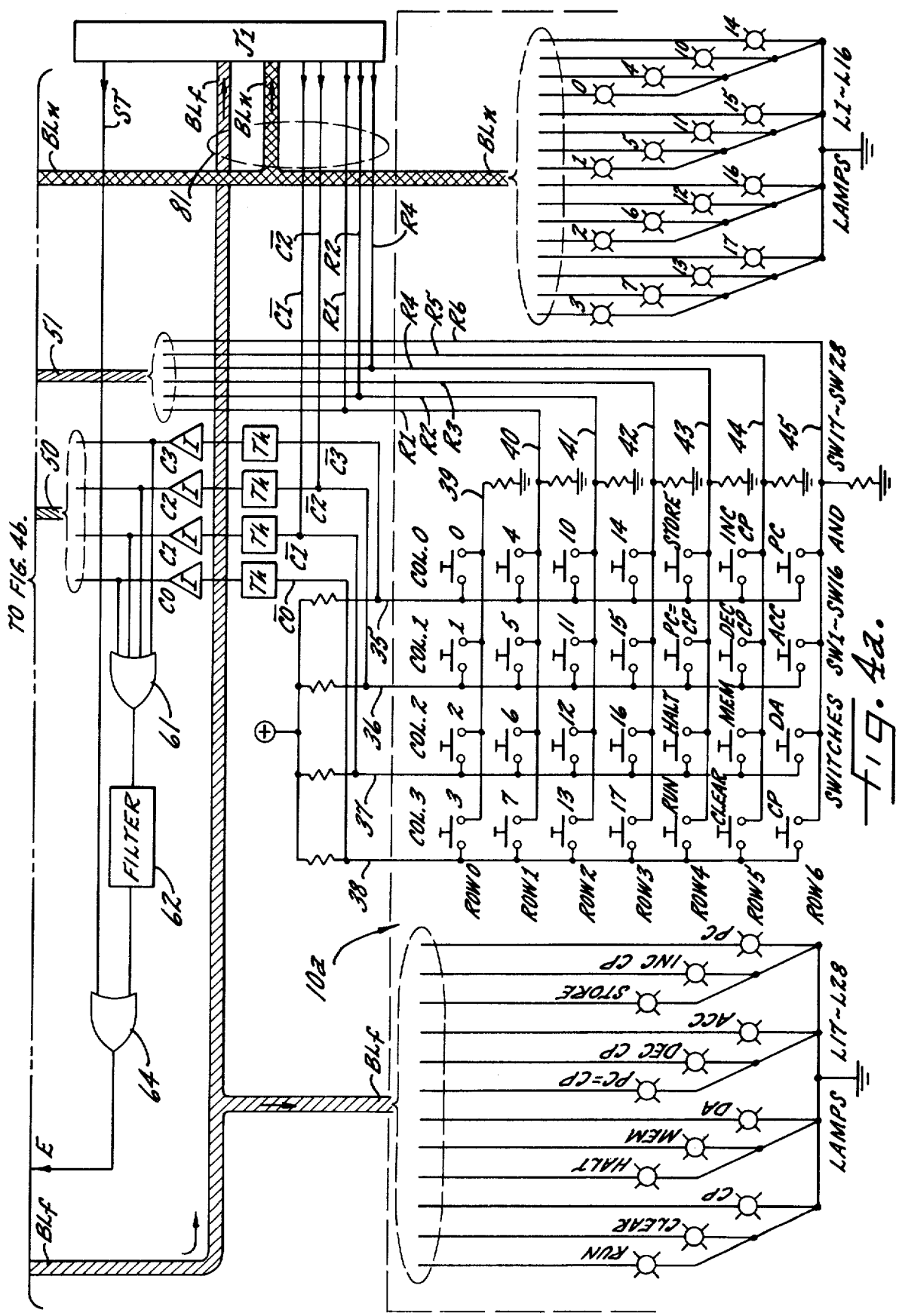
FIG. 3 is an elevation view of the console panel for the computer shown in FIG. 2.

On the assumption that the exemplary computer 10 operates with sixteen bit words, i.e., the system bus 22 contains sixteen conductors and all memory locations and word registers are sixteen bits wide, FIG. 3 shows the front panel of an exemplary console 10a. This mounts sixteen switches SW1 through SW16 in an upper row, each corresponding to one bit of a sixteen bit word. Each such switch physically is a push button switch actuated by momentarily depressing a translucent, hollow plastic button surrounding an indicator such as a small electric lamp (see SW1 and SW2 as examples). The buttons are respectively labeled with number legends which facilitate viewing any sixteen bit word in its octal equivalent, as is the convenient practice of skilled technicians. Twelve similar switches SW17 through SW28 are located in a bottom row on the console panel, their buttons having legends whose significance will become apparent presently. It will suffice to note here that there are sixteen upper switches for setting up the desired bit values of any data or instruction word, and there are twelve lower switches whose actuation determines what is done with that word, or what word is displayed. For convenient reference, the upper switches will be called "word switches" since they are actuated, as hereinafter noted, to set up a desired word; and the lower switches will be called "function" switches since they are actuated to carry out the desired function operations with respect to words set up on the console or brought to the console interface.

The sixteen lamps associated with the sixteen word switches, according to the combinations lighted, display a binary word so that it may be observed by a technician at the console. Moreover, since the function switches are identical to the word switches, there are twelve function lamps associated with the respective function switches to display to the technician the function status of the console interface.

Figure 4:
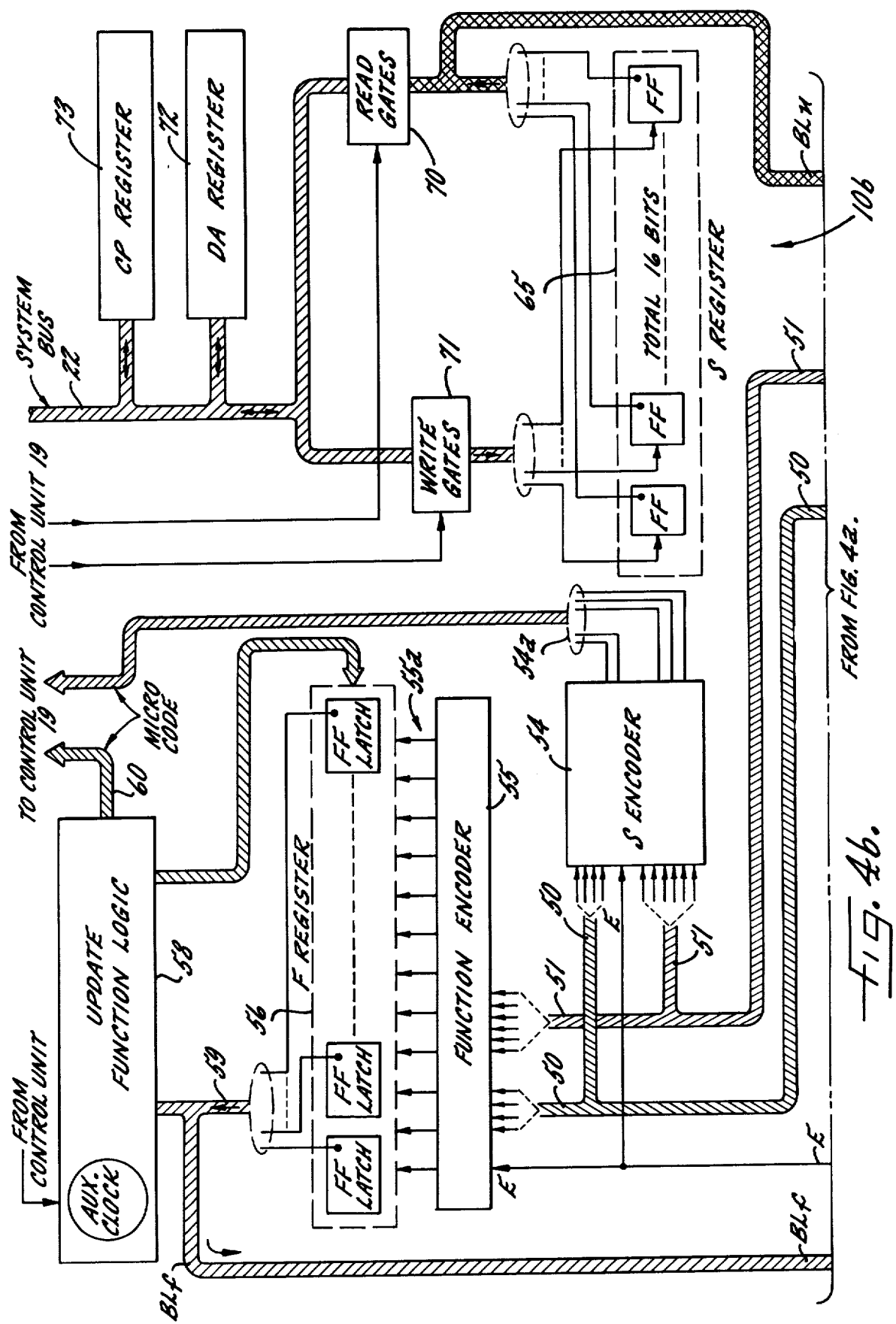
FIGS. 4a and 4b, when joined along the indicated junction lines, collectively constitute a diagrammatic illustration of the console and the console interface which form an existing portion of the computer shown in FIG. 2.

Digressing for the moment to the diagrammatic illustration in FIG. 4a, the twenty-eight switches SW1 through SW28 are there shown with the individual legends which appear in FIG. 3. It may be seen that these switches are connected in a four-by-seven array with four "column" conductors 35-38 leading through resistors to a source of positive voltage (represented by the symbol ⊕), and seven "row" conductors 39 through 45 leading through resistors to ground (low potential). This is done so that twenty-eight separate conductors for the twenty-eight switches are not required; the closure of any switch changes the signal levels on one column and one row to produce a unique code of column and row signals which identify the actuated switch. Assuming for discussion that the positive source voltage labeled ⊕ is twenty-four volts, then with no switch closed, all column conductors 35-38 will reside at a high (binary 1) voltage level and all row conductors 39-45 will reside at a low (binary 0) voltage level. If, for example, the switch marked with the legend 15 in the matrix of FIG. 4a (SW15 in FIG. 3) is closed, then current will flow through conductors 36 and 42 and their associated resistors. The column and the row resistors are chosen to have values in an appropriate ratio such that the voltage drop across the column resistor in conductor 36 will make an output line labeled $\overline{C2}$ fall from about +24 volts to +5 volts, whereas an output line labeled R3 will rise from 0 volts to about +5 volts. In other words, closure of the switch labeled 15 will convert the voltage output from column conductor 36 from a 1 to a 0 level and will convert the voltage output from row conductor 42 from a 0 to a 1 level. It becomes apparent from inspection of FIG. 4a, therefore, that closure of different ones of the twenty-eight switches will produce unique code responses on ten conductors here identified as $\overline{C0}$ through $\overline{C3}$ and R1 through R6, as shown in columns (1), (2) and (3) of the following Table I:

threshold circuits provide an output which is at the 0 level when the input is below about 8 volts and which is at a binary 1 or +5 volt level when the input is above 8 volts; they thus convert their input signals to the proper binary bistate levels (+5 or 0 volts) for subsequent utilization.

When a column conductor is "connected" by any switch closure, its output signal falls from 1 to 0. To convert this "actuation" of a switch to a conventional binary response (a transition from the 0 to the 1 level), the signals $\overline{C0}$, $\overline{C1}$, $\overline{C2}$, $\overline{C3}$ are passed through respective inverters I whose outputs C0, C1, C2, C3 are coupled to a four-conductor cable 50 on the interface board. The signals R1 through R6 on the row output conductors rise from 0 to 1 when any corresponding row is "connected" by a switch closure, and thus they couple from the console 10a directly to a six conductor cable 51 on the interface 10b. It will be understood from Table I that the combinations of signals on the ten conductors in cables 50 and 51 uniquely identify the closure of any one of the twenty-eight switches SW1 through SW28, those ten conductors all carrying binary 0 level voltages when no switch is actuated.

To convert the switch-identifying signals on the ten conductors in cables 50 and 51 into a different coded form, those cables lead to the inputs of a switch encoder 54 and a function encoder 55. The encoder 54 is a ten-to-five logic matrix which produces on its five output lines 54a a binary signal pattern representing any number from 1 to 16 as switches SW1 to SW16 are respectively actuated. The output lines 54a all reside at 0 binary levels when no switch is actuated or when any one of the function switches SW17–SW28 is actuated. The signal on output lines 54a forms a micro-code fed back to the computer control unit 19 to inform it that one,

TABLE I

| (1) SWITCH CLOSED | | (2) CONSOLE COL. SIGNALS | | | | (3) CONSOLE ROW SIGNALS | | | | | | (4) RESULT OF COUNTERPART REFLECTIVE SWITCH CLOSURE | | | | | | | | | | |
|---|---|---|---|---|---|---|---|---|---|---|---|---|---|---|---|---|---|---|---|---|---|---|
| NO. | LEGEND | $\overline{C3}$ | $\overline{C2}$ | $\overline{C1}$ | $\overline{C0}$ | R6 | R5 | R4 | R3 | R2 | R1 | $\overline{C3}$ | $\overline{C2}$ | $\overline{C1}$ | $\overline{C0}$ | R6 | R5 | R4 | R3 | R2 | R1 | ST |
| NONE | — | 1 | 1 | 1 | 1 | | | | | | | 1 | 1 | 1 | 1 | | | | | | | 0 |
| SW1 | 0 | 1 | 1 | 1 | | | | | | | | 1 | 1 | 1 | 1 | | | | | | | 1 |
| SW2 | 1 | 1 | 1 | | 1 | | | | | | | 1 | 1 | 0 | 1 | | | | | | | 1 |
| SW3 | 2 | 1 | | 1 | 1 | | | | | | | 1 | 0 | 1 | 1 | | | | | | | 1 |
| SW4 | 3 | | 1 | 1 | 1 | | | | | | | 1 | 0 | 0 | 1 | | | | | | | 1 |
| SW5 | 4 | 1 | 1 | 1 | | | | | | 1 | | 1 | 1 | 1 | 1 | | | | | 1 | | 1 |
| SW6 | 5 | 1 | 1 | | 1 | | | | | 1 | | 1 | 1 | 0 | 1 | | | | | 1 | | 1 |
| SW7 | 6 | 1 | | 1 | 1 | | | | | 1 | | 1 | 0 | 1 | 1 | | | | | 1 | | 1 |
| SW8 | 7 | | 1 | 1 | 1 | | | | | 1 | | 1 | 0 | 0 | 1 | | | | | 1 | | 1 |
| SW9 | 10 | 1 | 1 | 1 | | | | | 1 | | | 1 | 1 | 1 | 1 | | | | 1 | | | 1 |
| SW10 | 11 | 1 | 1 | | 1 | | | | 1 | | | 1 | 1 | 0 | 1 | | | | 1 | | | 1 |
| SW11 | 12 | 1 | | 1 | 1 | | | | 1 | | | 1 | 0 | 1 | 1 | | | | 1 | | | 1 |
| SW12 | 13 | | 1 | 1 | 1 | | | | 1 | | | 1 | 0 | 0 | 1 | | | | 1 | | | 1 |
| SW13 | 14 | 1 | 1 | 1 | | | | 1 | | | | 1 | 1 | 1 | 1 | | | 1 | | | | 1 |
| SW14 | 15 | 1 | 1 | | 1 | | | 1 | | | | 1 | 1 | 0 | 1 | | | 1 | 1 | | | 1 |
| SW15 | 16 | 1 | | 1 | 1 | | | 1 | | | | 1 | 0 | 1 | 1 | | | 1 | 1 | | | 1 |
| SW16 | 17 | | 1 | 1 | 1 | | | 1 | | | | 1 | 0 | 0 | 1 | | | 1 | 1 | | | 1 |
| SW17 | STORE | 1 | 1 | 1 | | | 1 | | | | | 1 | 1 | 1 | 1 | | 1 | | | | | 1 |
| SW18 | PC = CP | 1 | 1 | | 1 | | 1 | | | | | 1 | 1 | 0 | 1 | | 1 | | | | | 1 |
| SW19 | HALT | 1 | | 1 | 1 | | 1 | | | | | 1 | 0 | 1 | 1 | | 1 | | | | | 1 |
| SW20 | RUN | | 1 | 1 | 1 | | 1 | | | | | 1 | 0 | 0 | 1 | | 1 | | | | | 1 |
| SW21 | INC CP | 1 | 1 | 1 | | 1 | | | | | | 1 | 1 | 1 | 1 | | | | | 1 | | 1 |
| SW22 | DEC CP | 1 | 1 | | 1 | 1 | | | | | | 1 | 1 | 0 | 1 | | | | | 1 | | 1 |
| SW23 | MEM | 1 | | 1 | 1 | 1 | | | | | | 1 | 0 | 1 | 1 | | | | | 1 | | 1 |
| SW24 | CLEAR | | 1 | 1 | 1 | 1 | | | | | | 1 | 0 | 0 | 1 | | | | | 1 | | 1 |
| SW25 | PC | 1 | 1 | 1 | | | | | | | 1 | 1 | 1 | 1 | 1 | | | | 1 | | | 1 |
| SW26 | ACC | 1 | 1 | | 1 | | | | | | 1 | 1 | 1 | 0 | 1 | | | | 1 | | | 1 |
| SW27 | DA | 1 | | 1 | 1 | | | | | | 1 | 1 | 0 | 1 | 1 | | | | 1 | | | 1 |
| SW28 | CP | | 1 | 1 | 1 | | | | | | 1 | 1 | 0 | 0 | 1 | | | | 1 | | | 1 |

BLANK SPACES REPRESENT 0's.

The four conductors labeled $\overline{C0}$, $\overline{C1}$, $\overline{C2}$, $\overline{C3}$ lead through respective threshold circuits Th which are physically located on the interface board 10b. These and which one, of the word switches has been actuated. On the other hand, the function encoder 55 is a ten-to-twelve logic matrix which produces a binary 1 response on one of twelve output lines when a corresponding one of the twelve function switches SW17 to SW28 is actuated. These output lines lead to a function register 56; the signals thereon serve to set or release twelve latching flip-flops under the control of updating function logic circuits 58. Twelve output lines from the latching flip-flops of the register 56 connect via conductors 59 to the input of the logic circuits 58 and the latter supplies a micro-code via a cable 60 to the control unit so that the computer performs certain functions which will hereinafter be described.

In the use of push button switches, contact bounce or noise may create false responses. To avoid this, the encoders 54 and 55 are normally "gated off" and disabled except when an enabling signal E is applied thereto. As shown in FIGS. 4a and 4b, the column signals C0, C1, C2, C3 are all applied to an OR circuit 61 whose output is passed through a filter 62 and thence through an OR circuit 64 to the enabling inputs E of the encoders 54 and 55. Thus, the closure of any one of the twenty-eight switches will make one of column signals C0, C1, C2, C3 reside at a binary 1 level, so that the filter 62 receives an input signal. But a corresponding encoder enabling signal does not appear if the input signal to the filter is very short due to noise or contact bounce. In the latter event, the encoders 54 and 55 produce no response.

When any of the word switches SW1-SW16 is actuated, the result is reflected in the corresponding bit place of a switch register 65 which comprises sixteen bistate units such as flip-flops. Words other than those entered from the word switches SW1-SW16 may also be fed for storage in the switch register 65, as described below. At this point, however, it may be noted that the bit status of the S register 65 is at all times displayed on the console panel by those lamps L1-L16 associated with the upper row of push buttons. For this purpose, the sixteen output lines from the respective bit flip-flops of the S register 65 are coupled via a cable $BL_n$ to the respective word lamps L1-L16 shown at the lower right in FIG. 4a. These lamps are individually labeled in FIG. 4a with the legends which appear on their corresponding push buttons in FIG. 3, and from this it will be apparent that the lamps may also be designated at L1 through L16, corresponding to switches SW1 through SW16.

Further, in order to display the function status of the console and its interface, the twelve output lines from the individual flip-flop latches within the function register 56 are connected via a cable $BL_f$ to the twelve respective lights associated with the push buttons of the twelve function switches. These latter lamps appear in the lower left of FIG. 4a as lamps L17-L28, and are individually labeled with the legends which appear on the associated push buttons in FIG. 3. Although it is not necessary for every one of the function switches to have an associated lamp, twelve lamps are shown in the present instance merely for the sake of consistency.

In review, the console 10a includes a first set of word switches SW1-SW16 corresponding to the respective bits of a word as it is signaled on the system bus and in the memory of the computer 10. It includes a first set of indicators or lamps L1-L16 corresponding to the respective bits of a word. By actuation of the word switches and observation of the word lamps, and desired binary word may be set up in the S register 65, as described more fully below. Still further, the console includes a second set of function switches SW17-SW28 together with a second set of lamps L17-L28. The latter are excited so as to display the functional status of the console as it is represented by the states of the flip-flop latches in the function register 56, those latches being changed in response to actuation of different function switches, a described below. The connections between the console 10a and its interface 10b are therefore made by first and second sets of conductors. That is, a first plurality of ten conductors constituted by the column conductors 35-38 and the row conductors 40 through 45 extend from the first and second sets of switches SW1-SW16 and SW17-SW28 to the interface 10b and carry the signals $\overline{C0}$-$\overline{C3}$ as well as R1-R6. These signals change to a unique code identifying any particular switch which is closed, and enable the setting up of a binary word in the S register 65 with each bit having a desired 1 or 0 level. A second plurality of twenty-eight conductors is extended from the console 10a to the interface 10b, such conductors being contained within the cables $BL_n$ and $BL_f$. The F register 56 and the S register 65 may be viewed collectively as constituting a "display register" since it is the contents of those two registers which at all times create binary 1 or 0 signals (e.g., +5 volts or 0 volts) to turn on or off respective ones of the twenty-eight lamps and thereby make the latter display to an observer at the console the contents of the S register as well as the status or contents of the F register. Whenever the S or the F register is changed in its contents, that change is immediately reflected by the pattern of lighted lamps. Fortuitously, this involves the creation of twenty-eight bistate voltages for turning on or off the respective lamps, such voltage being viewable as bistate bits within a twenty-eight bit word.

The S register 65 communicates with the computer system bus 22 through READ and WRITE gates 70 and 71 enabled by signals supplied at different times and under different circumstances from the control unit 19. When the READ gates are opened, the S word is fed to the system bus and may be entered into the accumulator or otherwise transferred to different memory locations. When the WRITE gates 71 are opened, the word (selected by the control unit) then on the system bus 22 is stored in the S register by driving the latter's flip-flops to states agreeing with the bit signals of that word.

Shown for completeness in FIG. 4b are DA and CP registers 72 and 73 which communicate with the system bus 22 by input and output gating (not shown). These latter registers may be located physically in the computer control unit 19, but they are shown in FIG. 4b because they participate in operations carried out through the console.

For setting up any word in the S register, the actuation of a word switch is processed through the computer and the bus 22. The micro-code conductors 54a are sensed on a rapidly repeating time cycle by the control unit so that even the shortest switch closure humanly possible will be detected. If the micro-code signals at 54a indicate that any word switch has been closed, then the S register contents are taken via the bus 22 into the arithmetic unit 19, the bit corresponding to the actuated switch is inverted, and the modified word is restored in the S register. This is accomplished by routine programming whose details need not lengthen this description because they will be clearly understood by those skilled in the art. Actuation of any word switch SW$_n$ thus cause inversion of the n bit in the S register; and the status of that bit will, before and after the switch actuation, be indicated by the word lamp L$_n$. For example, if the lamp L3 is on (or off), and the switch SW3 is momentarily pressed, then the third bit in the S word register will switch from 1 to 0 (or 0 to 1) and the lamp L3 will turn off (or on). Merely by observing the word lamps and pressing different ones of the word switches SW1-SW16, a technician at the console may "set up" any desired word in the S register. He presses the word switches until those word lamps which correspond to bits which are desired to be 1's are turned on (with the remaining word lamps being off).

For ease of clearing, the function decoder 55, F register 56, and updating logic circuits 58 respond to closure of the CLEAR switch SW24 by supplying micro-code signals at 60 to the control unit which result in the S register 65 being cleared (all bits set to zero). Of course, this turns off all of the word lamps L1-L16.

Whenever any of the word switches SW1-SW16 or the CLEAR switch is actuated, the response of the encoder 55 and register 56 is to set a flip-flop latch which excites the STORE lamp L17. This indicates to the technician that the word in the S register is changeable (or has been changed) through the word switches, and it creates a STORE mode in the logic circuits 58.

The function switch lamps for DA, CP, PC and ACC are mutually exclusive (only one may be excited at any given time) and they designate the source of the word dispayed on the word lamps when the STORE lamp is off. That is, the function register 56 always produces a mode condition by which one of the indicator lamps DA, CP, PC or ACC is on. Closure of any one of the function switches DA, CP, PC or ACC changes on the previous mode to that agreeing with the last-actuated switch; the previously energized lamp goes off and the lamp corresponding to the last-actuated switch turns on. This of course involves changing of signals from the F register 56 and the condition of the function logic circuits 58.

The STORE mode is terminated by pressing the STORE switch, with the result that the register 56 turns the STORE lamp off. With the STORE lamp off, the micro-code produced at 60 causes the computer (on a rapidly iterated basis) to transfer the contents of the selected display source (register DA, register CP, program counter PC, or accumulator ACC) to the S register 65. More specifically:

(a) If lamp DA is on, and the STORE switch is actuated to turn off the STORE lamp, the contents of the S register are taken via the bus 22 and transferred into the DA register. Thereafter, the contents of the DA register will be reflected on the word lamps until some change is made to call for a different display.

(b) If the CP lamp is on, and the STORE switch is actuated to turn off the STORE lamp, the contents of the S register are taken via the bus 22 and transferred into the CP register. Thereafter, the contents of the CP register are displayed on the word lamps until some change is made to call for a different display.

(c) If the PC lamp is on, and the STORE switch is actuated to turn off the STORE lamp, the contents of the S register are taken via the bus 22 and transferred into the program counter (i.e., pre-setting the latter).

(d) If the ACC lamp is on, the contents of the computer accumulator are transferred into the S register 65, so that the word lamps display the contents of the accumulator. The previously set up contents of the S register are never transferred therefrom directly into the accumulator.

It will thus be seen that the console, its interface, and the computer with its program of instructions constitute means by which a word first set up in the S register (and observed on the word lamps) may be transferred into the DA register, the CP register, or the program counter; and they constitute a means by which the contents of the DA register, the CP register, the program counter or the accumulator may be brought as a binary word to the word display lamps and indicated thereon.

Frequently, a word representing a memory address will be set up on the S register and transferred (by pushing the STORE switch) into the DA or CP register. Thereafter, with the STORE light off as a result of causing such transfer, if the MEM switch is pushed (thereby turning on the MEM lamp), the console mode is changed. The computer, under the control of the micro-code signals at 60 now transfers into the S register (and thus to the word lights L1-L16) on a rapidly repeating basis the contents of a memory location whose address is signaled by the DA or the CP register (depending upon whether the DA or CP lamp is lit). In this way, any word of memory or the contents of any addressable register within the entire computer may be brought to the word display lights for observation.

There is a further means formed by the console and the computer, with its instruction program, for changing and setting to a desired condition the contents at any memory location. If the desired memory address location is first set up in the S register, the DA lamp turned on by pressing the DA switch, and the STORE switch is depressed, that address is transferred into the DA register, as previously described. Then, if the MEM switch is pressed (and the MEM lamp turned on), the contents of the memory location whose address is in the DA register will be transferred to the S register (and displayed), as previously described. Next, the word switches may be depressed (causing the STORE light to turn on) until the word lights indicate the new word which is desired to be placed in memory at the previously set-up address. When the STORE switch is then actuated (turning out the STORE lamp), the computer takes the word in the S register onto the system bus and writes it into the memory location whose address is then contained in the DA register.

If the RUN lamp is pushed (when the HALT lamp is off) the program counter of the computer will run and a sequence of programmed instructions will be executed in normal fashion. If the HALT switch is pushed, the program counter is stopped and the HALT lamp turns on. To restart the program counter, the HALT switch is again pushed (turning off the HALT lamp), and the RUN switch is pressed (turning on the RUN lamp). It is advantageous to be able to start and stop the program counter, as noted below. Indeed, with the program counter halted, then it may be set to any desired program step (representing a desired starting address for instruction words in memory). Thus, as noted above, when the HALT lamp is on and the program counter is stopped, a desired address may be set up in the S register, after which the PC switch is pressed and the STORE switch is actuated so that such address in the S register is transferred into the program counter.

While a program of instructions is running in the computer 10, the contents of a data word at a particular memory location or register may be changing from point to point within a program cycle. Display of that memory word would therefore be imprecise. To synchronize the display so that it always occurs on a particular program step, the DA and CP registers may be used in conjunction. First, the desired program step is set up on the word switches and S register, and then stored in the CP register; then the address of the desired memory word is set up and stored in the DA register. The switches PC=CP and MEM are pressed (and their lamps lit). In this mode when the program counter reaches a count state equal to the number in the CP register, the contents of the memory word, whose address is signaled by the DA register, are transferred to the S register and displayed by the word lamps. In this way, the technician manipulating the console 10a knows that he is seeing the desired memory word at a point in the program cycle which he has selected by entry of a program step-representing number into the CP register.

Finally, the CP register may be used to store an address, and with the switch MEM having been pressed, the contents of the memory word at that address will be shown on the display lamps. If now the INC-CP or DEC-CP switch is pressed, the address stored in the CP register will be increased or decreased by one. A different word of memory (usually the next higher or the next lower instruction word) will thus be displayed on the word lamps. This makes it easy to follow through and observe a sequence of several instructions to verify that they are correct. Alternatively, if the CP register, instead of the DA register, is used to hold the address of a memory location into which a new word (set up in the S register) is to be placed, then the CP register can be successively incremented (after each storage from the S register to memory) by pressing the INC-CP switch—so that a whole succession of words at sequential addresses in the memory may be entered without taking time to change the address number in the register CP through manipulation of the S switches.

Because the computer 10 as here described, with the console 10a and interface 10b, is available on the market and in public use (being known as the Model 3200 computer made and sold by Giddings & Lewis, Inc. of Fond du Lac, Wisconson), its details are fully known and available to those skilled in the art. For conciseness, therefore, a more elementary and lengthy description will be omitted here. Yet, as typical of other computers having consoles, it will now be apparent that the conductors $\overline{C0}$–$\overline{C3}$ and R1–R6, extending between the console and its interface form an avenue by which any word (ordinarily set up on the word switches SW1–SW16) may be entered one bit at a time and thereafter sent to any location within the computer, the destination being determined by the status of the function lamps set up by signals entered over those same ten conductors. Conversely the twenty-eight conductors (fewer are actually necessary) in the cables $BL_n$ and $BL_f$ carry signals representing any desired word as it exists in the computer 10, the selection of a particular word ordinarily being made by prior actuation of the word and function switches, as described above.

The Remote Communication System, In General

In accordance with the present invention, binary words are transmitted into and out of the computer 10 by entry through a first plurality of conductors, and exit via a second plurality of conductors, which extend between the console 10a and the interface 10b. These conductors are readily available and no special interface hardware (except perhaps a piggyback connector) is required to tap into them. The entry of any word is on a bit by bit serial basis, but exiting of a word is on a parallel basis from the lamp conductors $BL_n$ and $BL_f$, the former signaling a sixteen bit data or instruction word.

Referring again to FIG. 2, a bundle of conductors 80 is shown as extending between the console 10a and the interface 10b. This bundle of conductors is constituted by the ten row and column conductors $\overline{C0}$–$\overline{C3}$ and R1–R6 as they appear in FIG. 4a, plus the sixteen lamp conductors in the cable $BL_n$, plus the twelve lamp conductors contained in the cable $BL_f$ shown in FIG. 4a. The interconnecting conductors 80 are "tapped" by connecting conductors in a cable 81 (FIG. 2) which leads to the exterior of the computer 10. This is illustrated in FIG. 4a by connections which lead from conductors $\overline{C1}$, $\overline{C2}$, R1, R2, R4 as well as conductors which lead from the cables $BL_f$ and $BL_n$ to a connector socket J1. It may be noted that while there are ten conductors in the first set constituted by $\overline{C0}$–$\overline{C3}$ and R1–R6, only five corresponding conductors lead to the connector socket J1. These are connections $\overline{C1}$, $\overline{C2}$, R1, R2, R4. The reason for this will be made clear as this description proceeds.

In accordance with one aspect of the present invention, the cable 81 connects to a means for de-serializing and serializing the signals which are sent to and from the conductors 80 over the cable 81, such means preferably being formed by a microcomputer 82 (FIG. 2) to be described below. For the present it will suffice to say that the microcomputer 82 forms a means responsive to any combination of 1's and 0's on the twenty-eight lamp conductors $BL_n$ and $BL_f$ for creating a train of time-spaced pulses, with the pulses appearing in time locations which correspond to bits containing a binary 1 level. On the other hand, the microcomputer 82 forms a means responsive to trains of time-spaced pulses which it receives (from home base) to produce sets of binary signals (a five place code) fed over the cable 81 to the interface switch conductors, each set of such signals producing in the interface 10b the same effect as if the switch corresponding thereto had been actuated. The microcomputer 82 transmits its output pulse trains, and receives its input pulse trains from, an associated conventional, commercially available modem 84 (frequency shift keying modulator-demodulator) coupled to a telephone set 85.

The telephone 85 may be connected (be previous dialing) over the single telephone circuit 11 to the home base 12 at a considerable distance from the computer site 14. That single telephone line leads to a home base telephone 86 associated with a second modem 88 which, generally stated, has its input and output lines leading to the input/output memory section 89 of a home base computer 90. The latter may, but need not be, similar to the computer 10. In any event, single bit input/output lines from the computer memory 89 lead to a reflective console 91 which is essentially identical to the console 10a (FIGS. 2 and 4a). As will become apparent below, and in the advantageous use of the present invention, a technician standing before the reflective console may actuate its word and function switches, and read its display lamps, just as if he were in fact standing before the computer console 10a.

The microcomputer 82 contains the components which are broadly illustrated in FIG. 2, namely, a clock 100 supplying timing signals to a microprocessor 101 and other portions of the unit, together with a memory section 102 which includes a ROM portion for instruction words, a RAM portion for data words, and a portion for input/output bits treated as multi-bit words of memory. Moreover, the microcomputer 82 includes an asynchronous receiver-transmitter 104 which accepts or transmits input pulses on an input line 104a and an output line 104b under the control of a free-running baud rate clock. A more specific description of the microcomputer 82 will be presented below with reference to FIG. 5, and it will be sufficient for the present to understand that the microcomputer serves as a free-standing device with its own clock to process and handle messages which are to be sent from the computer 10a via the telephone line 11 to the home base 12, and also to process and convert time-spaced pulse messages received from the home base 12 via the telephone line so that they are in the proper format for routing over the cable 81 to the interface conductors 80 of the computer 10.

The home base computer 90 may be any suitable general purpose computer to which is added an asynchronous receiver-transmitter (not shown in FIG. 2) to accept time-spaced pulses from the modem 88 and to transmit time-spaced pulses to the modem 88. As generally shown in FIG. 2, and with a degree of similarity to the computer 10, the home base computer has a clock 110 which supplies timing pulses to a control unit 111, an arithmetic unit or ALU 112 and a memory 114 which includes a section for instruction words, a section for data words, and a section 89 for input/output words of which the individual bits are treated as individual bi-state signals. The home base computer 90 will be treated in somewhat more detail hereinafter with reference to FIG. 6.

The Microcomputer 82

Figure 5:
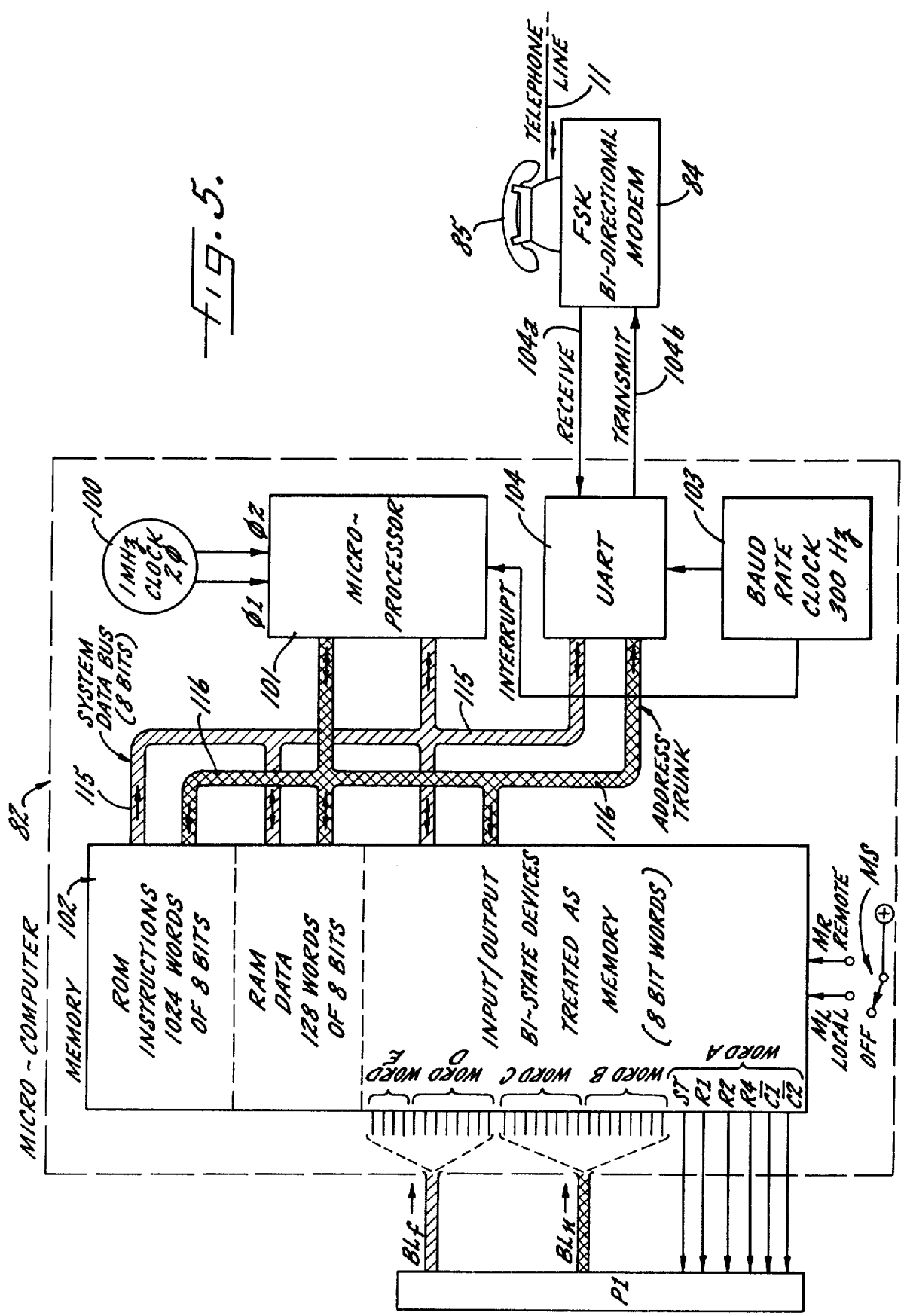
FIG. 5 is a more detailed illustration, in block form, of the microcomputer which appears in FIG. 2.

Referring next to FIG. 5, the microcomputer 82 is there illustrated in somewhat more detail. It is a small computer with limited memory and which operates with eight bit words. As shown, the microprocessor 101 communicates with the memory system 102 via a system data bus 115 as well as a universal asynchronous receiver-transmitter (UART) 104. An address trunk 116 extends between the microprocessor 101, the sections of memory 102 and the UART 104. The microprocessor 101, timed by the clock 100, functions as a control unit and arithmetic-logic unit. As is well known, it effectively includes an instruction input register (IAR), an arithmetic input register (AIR), a program counter, and an arithmetic-logic unit. As the program counter progressively counts through its successive states to create program steps, instructions are fetched from instruction memory to the microprocessor, and those instructions are then executed by bringing an operand word from a memory address, or storing into a memory address, specified in the instruction to the microprocessor to perform the particular operation specified by an operation code in the instruction. Aside from the fact that the program of instructions is relatively fixed by storage in read-only memory storage locations, and that the available number of data words in an RAM memory section is limited, the microcomputer 82 is essentially like a small version of an ordinary digital computer. The UART 104 (which is a known, commercially available unit) is treated somewhat like a portion of memory. That is, when it receives an appropriate address via the trunk 116 it feeds onto the system bus 115 an eight bit word formed by the accumulation of eight sequentially received pulses. On the other hand, when a different and proper address is fed to the UART over the address trunk 116, it accepts into an eight bit transmit register the word then signaled on the bus 115. Once any eight bit word has been stored as a part of a message to be transmitted, the output pulse train is created on the conductor 104b at a time location (bit) rate of 300 Hz. measured off by a baud rate clock 103. The baud clock 103 and the main clock 100 are not synchronized, but each baud clock pulse is fed into the microprocessor 101 so it, in effect, creates an interrupt which synchronizes the successive operations of the microcomputer to the real time of the UART 104 transmissions and receptions.

As illustrated in the left portion of FIG. 5, a connector plug P1, which joins to the socket J1 in FIG. 4a, establishes thirty-four connections via the cable 81 to the input/output portions of the memory 102. It may be seen that six connections are made respectively to the $\overline{C1}$, $\overline{C2}$, R1, R2, R4 conductors as the latter appear in FIG. 4a where they are included in a group of ten conductors by which console switch closures are signaled to the console interface 10b. In effect, any of the several possible combinational codes of binary signals on those five conductors produces a response in the computer 10 which is the same as if a selected one of the twenty-eight switches (the one corresponding to the code) had been actuated. These five conductors in FIG. 5 are designated as constituting word A and different patterns of binary signals may be fed to them via the bus 115 under the control of the microprocessor 101, as hereinafter explained.

A sixth conductor labeled ST serves to carry a "strobe" signal which appears when any valid combination of signals has been placed on the five word A conductors described above. The line ST is treated as the lowest order bit in the word A. This causes acceptance of those five word A signals into the encoders of the interface 10b as noted below.

The sixteen lamp word conductors in the cable $BL_n$ carry signals forming input words for the microcomputer 82. These sixteen conductors are for convenience labeled words B and C. In a similar fashion, the twelve conductors associated with function lamps and contained in the cable $BL_f$ form input bits to the microcomputer 82. They are treated, as shown, as constituting an eight bit word D and four bits of a word E (the remaining bits being used for other purposes).

Finally, the microcomputer 82 is set up to establish either a "local" or a "remote" mode of operation according to the setting of a three position selector switch $M_S$. In the off position, neither mode is selected; with the switch $M_S$ at the "local" position, a positive, binary 1 level voltage is supplied as an input bit $M_L$ to a line forming a part of the memory; and in the "remote" position a binary 1 level voltage is supplied as an input bit $M_R$ to the system memory. The bits $M_L$ and $M_R$ are treated as the fifth and sixth bits of memory word E. This switch $M_S$ is set by the local repairman according to voice directions given to him by the expert technician at home base.

With the foregoing as a general description of the physical components in the microcomputer 82, a further understanding of its physical organization and operation is best gained from a description of its operating program which is to follow.

Apparatus At Home Base

Turning now to FIG. 6, the home base computer 90 is there shown as including within its input/output memory section 89 a standard, commercially available UART 89a which functions in the manner previously set forth for the UART 104 in FIG. 5. That is, it receives time-spaced pulse trains from the modem 88 after they have been received via the telephone line 11, and it packs those serial 1 or 0 bits into successive eight bit parallel words which can thereafter be transferred, under the instruction program of the computer 90, into assigned sixteen bit memory locations. Moreover, as successive eight bit words are entered into the UART 89a, it operates with the timing of a baud rate clock (not shown) to transmit successive characters each having the form of eight time-spaced locations with each location containing a low or high voltage level to represent a binary 1 or 0. When such voltage pulse trains are received by the modem 88, it in turn frequency shits or modulates a tone signal generator so that the intelligence supplied to the telephone line is a series of time-spaced "pulses" of frequency variations, one frequency representing a 0 level and another frequency representing a 1 level.

As is well known to those skilled in the art, the telephone line 11 and the two modems 84 operate to send intelligence in both directions simultaneously. That is, a first frequency is modulated between upper and lower values by pulses originating in the UART 89a for transmission to the computer site. Such pulses are demodulated at the modem 84 and thus converted into a corresponding train of voltage pulses on the receive line 104a (FIG. 5). On the other hand, time-spaced pulses produced by the UART 104 on the transmit line 104b cause the modem 84 to modulate a second frequency which is simultaneously applied to the telephone line 11 and which shifts from one frequency level to another to represent a binary 1 as contrasted to a binary 0 level. This second frequency range is demodulated at the modem 88 to produce a corresponding train of voltage pulses on a receive line 88a at the home base. Therefore, pulse train messages can be moving from home base to the computer site, or from the computer site to home base, simultaneously.

As shown in FIG. 6, the reflective console 91 contains an upper row of sixteen push button switches WS and a lower row of twelve function push button switches FS—and each of these switches contains a lamp in the fashion previously described with reference to the console 10a shown in FIGS. 2, 3, 4a and 4b. Thus, the reflective console 91 at the home base is completely a structural counterpart of the console 10a. It therefore possesses ten conductors (four column conductors and six row conductors) over which the actuation of any word switch WS or any function switch FS is uniquely signaled. These conductors lead to input lines forming individual bits of input memory words in the home base computer 90. In one mode of operation, these bits are sensed periodically according to the instruction program of the computer 90 and each switch actuation is therefore sensed and converted into a counterpart five bit code word.

Further, the sixteen word light conductors and the twelve function light conductors, by which the lamps within the reflective console 91 may be individually energized or deenergized, lead from twenty-eight lines forming bit outputs of the input/output memory section 89. Under its instruction program contained in memory, the computer 90 may place those lamp-controlling conductors at high or low (on or off) voltages according to the pattern of binary levels fed into those particular memory locations. The instruction program of the computer 90 causes the update of the lamp-controlling output lines according to the latest information received from the console and which designates the status of the lamps in the console 10a of the remotely-located computer 10.

In addition to the special reflective console 91, the home base computer 90 (FIG. 6) may have associated therewith one or more conventional peripheral devices for the input or output, or display, of whole sets of data or instructions. As illustrated in FIG. 6, a teletype typewriter 120, a magnetic disk memory 121 and a CRT display 122 are coupled to the computer 90 via interfaces 124. They are serviced by instructions stored in the memory 114 so that data may be fed into or out of them. The CRT may thus display in visually readable characters various types of selected information as it exists in the memory of the computer, and indeed may indicate in English words the console mode which is represented on the function lights of the console 91. Alternatively the CRT display may indicate in decimal numbers the values displayed on the word switches WS of that console. The magnetic disk memory unit 121, on the other hand, may store whole sets of special diagnostic programs each comprising any quantity of successive sixteen bit instruction words. Any selected program may be read into the computer 90 and fed therefrom through the UART 89a (eight bits at a time) for transmission to the instruction memory of the computer 10. The latter may thus be conditioned for executing special program routines which will detect and indicate particular malfunctions in apparatus elements or in a stored basic program of instructions. Moreover, information may be typed into or printed out from the computer 90 by the teletype typewriter 120 in conventional fashion.

Repetitive Messages To Home

Turning attention now to the manner in which information is sent from the computer 10 to the home base, the status of the console lights L1–L28 is repeatedly packaged into a "message to home" at an iteration rate on the order of every 0.2 or 0.3 seconds. Recalling from the earlier description herein that any word may be brought to the S register for display on the word lights L1–L16, it is thus possible to send back to the home base an indication of which lights are receiving an exciting voltage and therefore which bits of that word are in the 1 state. Because four eight-bit words are required to contain the twenty-eight bits constituted of high or low (binary 1 or 0) voltages on the conductors leading to the twenty-eight console lamps L1–L28, each such message comprises four time-spaced groups (often called "characters") each containing eight time locations. A binary 1 or 0 is represented by the presence or absence of a voltage pulse at each time location within a time-spaced pulse group or character. While in actual practice the rapidly repeating "messages to home" may contain six or seven characters for leader and checking purposes plus bits of information in addition to the status of console lamps, such details will be omitted here for brevity and each "message to home" will be considered as made up of four groups of time-spaced pulses, each group containing eight bit locations.

The microcomputer 82 (FIG. 5) by its instruction program will periodically "look at" the twenty-eight lamp conductors which supply 1 or 0 signals, depending upon the state of the corresponding lamps, to input bits of its memory. As indicated in FIG. 5, the lamp voltages produced in the S register of FIG. 4b are fed through the sixteen conductors of the cable $BL_n$, the first eight conductors thereof corresponding to lamps L1–L8 (and to bits b1–b8 in the S register) being treated as word B. The next eight conductors corresponding to word lamps L9–L16 are treated as word C in the microcomputer memory. In a similar fashion, the first eight conductors in the cable $BL_f$, and which carry voltages indicating the energization states of lamps L17–L24, are treated as a word D of memory; while the last four conductors in the cable $BL_f$, and the signals thereon corresponding to the energization states of lamps L25–L28, are treated as four bits of a word E of memory (the latter being an eight bit word whose remaining four bit places may be used for other purposes).

In the process of executing successive cycles of its program of instructions, the microcomputer 82 will cause the lamp status word B to be read from memory onto its system bus 115 and then stored as the contents of a data memory word (which may be called word I). It then pulls the word C from input-output memory and stores it as a data word (which may be called word J). Thereafter, the lamp status words D and E are successively pulled from memory and stored as data words (which may be called words K and L). After such storage in data memory, the words I, J, K and L are successively transferred into the input register of the UART 104. After each such word is transferred, eight baud clock pulses will cause the UART to create on its transmission line 104b a group of pulses having eight time slots corresponding to the eight bits but with pulses appearing only in those time slots which correspond to bit locations containing 1's in the transferred word. Thus, the words I, J, K and L are converted into a message consisting of four time-spaced groups of pulses, with each group representing eight time slots, and with pulses at those locations which correspond to the console lamps then lit.

The modem 84 converts that pulse train into a corresponding frequency modulated train which is applied to the telephone line 11. At home base, the modem 88 (FIG. 6) demodulates the frequency modulated pulse train into a time-spaced voltage pulse train corresponding to that originally applied to the transmit line 104b in FIG. 5. The reproduced pulse train on line 88a in FIG. 6 is accepted into the UART 89a one bit at a time in the successive places of an eight bit receiving register (not shown). The first eight bit word so formed is taken by the computer 90 from the UART receiving register onto the computer bus and then stored in eight places of memory bits having output conductors leading to the first eight lamps (corresponding to lamps L1–8) in the reflective console 91. The second, third and fourth character groups of input pulses are treated similarly in succession except that they are stored by the computer 90 at different memory bit locations which lead to those output conductors connected to reflective console lamps corresponding to lamps L9–L16, L17–L24 and L25–L28. The program of instructions in the home base computer to effect such successive transfers from the UART 89a to specified memory locations is elementary, and will be understood by one skilled in the art from the brief description set forth above.

Recalling that two bits of the word E (FIG. 5) are formed by the memory lines and signals $M_R$ and $M_L$, these signals will be included in every "message to home" and will be lodged in specified bit locations of the home base computer memory. As a result, the computer 90 may display on its CRT the mode (remote or local) in which the system has been placed by the selector switch $M_S$.

Because of the states of the computer console lamps (and thus the states of the S and F registers) are sensed and transmitted by successive "messages to home" so frequently, the reflective console lamps, in effect, always agree with their counterpart computer console lamps. As different words are brought into the S register 65 (FIG. 4b) in the computer 10, and thus the console lights are changed in their excitation pattern, a similar change in the excitation of lights at the reflective console 91 immediately occurs. Similarly, as the pattern of energized console lights changes due to actuation of the word switches SW1 through SW16, or due to actuation of the function switches SW17–SW28, the console lights at the home base immediately "reflect" and correspond to such changes.

Noteworthy is the fact that such pattern of energized lights is stored (and frequently updated) in the memory of the home base computer 90. Thus, that computer (in addition to sending signals to the lamps of the reflective console 91) may read onto its bus all or some of the twenty-eight memory bits indicative of the console light status and employ the resulting signals for display on the CRT 122 or for printout on the teletypewriter 120. Indeed, the computer 10 and its console 10a may be put in that status where the register CP is initially set to the beginning address of a whole series of successive memory words of interest and the "memory mode" established by depressing (physically or artificially) the MEM switch so that the first of such words is displayed on the console word lamps L1–L16. If then the INC CP switch is successively actuated (physically or artificially) the contents of successive memory address locations in the computer 10 will be successively sent back to the home base computer and placed in its memory bit places which feed the lamps on the console 91. But as those successive words are thus present in the memory of the computer 90, they may be pulled therefrom and printed out on the teletype typewriter 120—with the end result that a printout at home base of a whole succession of memory words in the distant computer 10 is available for inspection by the home base technician.

Messages from Home, Slow Mode

The transmission of "messages from home" to the computer 10 may occur in either a "slow mode" or a "fast mode", each of which has certain advantages. The slow mode makes effective use of the reflective console, and it will be described first.

When a slow mode flag has been set in the computer 90 by the home base technician, the home base computer 90 is conditioned to repeatedly enter a subroutine by which the voltage levels on the column conductors $\overline{C0'}$–$\overline{C3'}$ and row conductors R1'–R6' (leading from the reflective console switches, as shown in FIG. 6) are sensed. They are stored with updated bit levels in a word of data memory on a rapidly repeated basis so that even a very momentary closure of any switch is detected. When that stored word takes on a pattern (a 0 level in any of its bits corresponding to $\overline{C0'}$–$\overline{C3'}$) indicating that one of the twenty-eight reflective console switches has been closed, then a special eight bit code word meaning "arm for slow mode" is first transferred into the transmission register of the UART 89a. The "arm for slow" code is arbitrarily chosen to be any combination which differs from all "switch codes"(to be described)—for example, to represent numerically "127". A corresponding serial word pulse train 01111111 is fed to the line 88b (FIG. 6) and, in effect, transmitted to the microcomputer 82. Thereafter, the signals in the stored word corresponding to the ten signals $\overline{C0}'-\overline{C3}'$ and R1'–R6' resulting from closure of a reflective console switch are processed through a look-up table to convert them into a different, but corresponding, five-bit word pattern. Specifically, if the four column signals $\overline{C0}'$, $\overline{C1}'$, $\overline{C2}'$, $\overline{C3}'$ by a 0 level for one of them designates that a switch in column 0, 1, 2 or 3 has been closed, then a counterpart two bit code is formed as indicated in the following Table II:

TABLE II

| Refl. Console Col. Signals | | | | Subst. Code | |
|---|---|---|---|---|---|
| $\overline{C3}'$ | $\overline{C2}'$ | $\overline{C1}'$ | $\overline{C0}'$ | $\overline{c2}$ | $\overline{c1}$ |
| 1 | 1 | 1 | 1 | — | — |
| 1 | 1 | 1 | 0 | 1 | 1 |
| 1 | 1 | 0 | 1 | 1 | 0 |
| 1 | 0 | 1 | 1 | 0 | 1 |
| 0 | 1 | 1 | 1 | 0 | 0 |

TABLE III

| Refl. Console Row Signals | Substitute Code | | |
|---|---|---|---|
| Single Signal at "1" | r4 | r2 | r1 |
| NONE | 0 | 0 | 0 |
| R1' | 0 | 0 | 1 |
| R2' | 0 | 1 | 0 |
| R3' | 0 | 1 | 1 |
| R4' | 1 | 0 | 0 |
| R5' | 1 | 0 | 1 |
| R6' | 1 | 1 | 0 |

Similarly, since the closure of any switch on the reflective console may result in one of the row conductors R1'–R6' residing at a binary 1 level, the six place code (containing a 1 in only one place) is converted by a look-up table to a counterpart three place code according to the pattern indicated in Table III above. By this technique, the four conductors required to carry column signals and the six conductors required to carry row signals (as explained earlier with reference to the console 10a shown in FIG. 4a) are reduced to two conductors to convey column information and three conductors to convey row information. A five bit word is thus formed by the programmed operation of the computer 90 from the stored switch closure signals represented by ten bits. That five bit word has the format $\overline{c2}$, $\overline{c1}$, r1, r2, r4—where any of the five bits may take on a binary 1 or 0 level. The substitute code word—which uniquely represents the closure of any switch on the reflective console 91—is fed to bit places b2–b6 in the input register of the UART 89a. The remaining three bits b1, b7, b8 in the input register are not significant but may be employed for parity checking, if desired, by well known techniques not here described.

After each reflective console switch closure, the transmission of an eight bit "slow arm" pulse group, and the lodging of five bit switch identification code in the UART transmission register, a baud clock (not shown) activates the UART so that signals in an eight place pulse train are transmitted, the second through the sixth bit locations corresponding to the signals r1, r2, r4, $\overline{c1}$, $\overline{c2}$. In those respective time locations of the eight bit pulse train group, corresponding to those ones of the foregoing signals having a 1 value, a pulse will be transmitted. Only two eight bit characters—the first being an "arm slow mode" code and the second containing a five bit code uniquely identifying the reflective console switch which has been actuated—are contained in each "slow mode message from home". When another reflective console switch is pressed, a similar two character message will be formed and sent from the home base.

The program instructions for putting the home base computer through the operations, including code conversions by look-up tables, may take different specific forms, but they are so elementary in nature that they will be fully understood and readily applied by one skilled in the art from the description set forth in the preceding paragraph.

At the microcomputer 82, the UART 104 receives the first character pulse train bit by bit in successive places of an eight bit receiving register, thereby forming a parallel word. That eight bit word is then pulled onto the micro-computer bus 115 (FIG. 5), compared to see if it is equal to "127", i.e., the arbitrarily chosen slow arming code. If so, the microcomputer is conditioned to accept the following character and to treat it as a coded representation of one of the twenty-eight console switches. The second character of the message is received bit by bit in the UART receiving register to form a parallel eight bit word which is then read onto the bus 115 (only bits b2–b6 being of significance). That five bit word is taken through the microprocessor 101 and on the next program step is "written", with a 1 automatically added in the first bit place for ST, into memory word A as labeled in FIG. 5. The binary 1 or 0 values for the respective bits $\overline{c2}$, $\overline{c1}$, r4, r2, r1 are thus applied to the five memory output lines which are labeled $\overline{C2}$, $\overline{C1}$ R4, R2, R1 (with a strobe voltage applied to ST) which connect to the correspondingly labeled conductors in FIG. 4a. At a slightly later program step for the microcomputer, the word A is restored to its normal pattern of 011000 which signifies no artificial switch closure.

Referring to FIG. 4a, the strobe pulse, which appears briefly on the conductor ST, passes through the OR circuit 64 to create the signal E, and thus enables the encoders 54 and 55 to respond to their input signal combination as created by the signals from the microcomputer 82 on the conductors $\overline{C1}$, $\overline{C2}$, R1, R2, R4. It will be seen that the strobe pulse on conductor ST bypasses the filter 62 (there being no contact bounce problem) so that each input to the encoders may be brief. Recalling that when no switch on the console is closed, the column signals $\overline{C0}$–$\overline{C3}$ are all binary 1's, and the row signals R1–R6 are all binary 0's, the signals $\overline{C0}$, $\overline{C3}$, R3, R5, R6 will remain the same no matter what switch code is received from the word A output conductors of the micro-computer 82. As a result of closure of any reflective console switch, however, different ones of the signals $\overline{C1}$, $\overline{C2}$, R1, R2, R4 will change, and the resulting combination of ten signals on the row and column output conductors will take on one of the unique patterns listed under (4) in Table I, supra. After the column signals $\overline{C0}$–$\overline{C3}$ are inverted by the inverters I, the ten input signals to the encoders 54 and 55 will produce the same responses at 54a and 55a whether the ten bit pattern of inputs is like that shown in columns (2) or (3) or like that shown in column (4) for a given line of Table I. That is, and by way of example, if the switch SW3 on the console is closed to produce the pattern of row in column signals designated in columns (2) and (3) of Table I, closure of the counterpart of the switch SW3 at the reflective console will result in the ten conductor pattern of signals shown by column (4) in the same line of Table I,—and the two patterns will produce exactly the same response by the encoders 54 and 55. Thus, the encoders do not know whether a given input applied to them has resulted from closure of a switch on the console or closure of its counterpart switch at the reflective console.

After one two character slow message has been received—and has caused the same effect in the computer 10 as closure of the console switch corresponding to its actuated counterpart at the reflective console—another switch may be pressed at the reflective console to create a second two character message and the same operations described. Of course, the "effective" or "artificial" actuation of console switches by closure of counterpart switches at the home base will cause different patterns of excited lamps at the computer console. But, as explained above, such changes will almost immediately be mirrored on the reflective console lamps by the rapidly recurring "messages to home" transmitted simultaneously (or with time interlacing) while messages from home are being received. Thus, an expert technician standing at the reflective console may actuate its switches and observe its lamps with all the same effect and advantages as if he were standing at the computer console many miles away. Using his experience, intuition and judgment, that expert at the home base may try out different inputs to the computer 10 and visually observe the results, thereby bringing to bear in troubleshooting of the computer 10 human intelligence which is lacking in the use of pre-specified diagnostic programs.

Messages From Home, Fast Mode

Although the slow mode transmission of messages from home (and with messages to home being simultaneously sent on a rapidly repeating basis) makes the reflective console 91 an extremely advantageous tool for checking or diagnosing the distant computer 10, there are cases in which whole programs of instructions or multi-word sets of data are desirably to be sent from home base to the computer 10. Manifestly, transmission of such a volume of information words by manual actuation of the reflective console switches would be unduly time-consuming. Notably, and as an example, diagnostic programs (with automatic halts to check for correct responses) can be used effectively to locate the source of some malfunction or trouble in the computer 10. But it is often the case that the user of the computer does not have a full library of diagnostic programs on magnetic or punched tape, or that a special diagnostic program is available only at home base because it requires for effective use skill greater than that of an ordinary repairman. Thus, there will be instances in which it is desired to send entire multi-word programs of diagnostic instructions from home base to the computer 10.

The present invention utilizes the switch signal conductors which exist between the console 10a and its interface 10b in the computer 10 for injection of long messages by a fast mode now to be described.

Let it be assumed by way of example that a diagnostic program of some fifty sixteen bit instruction words is to be sent from the home base for entry into the computer 10 at the latter's memory address locations aaa to aaa+50. That diagnostic program may reside on a magnetic disk at the home base, in which case it is first read into available memory locations of the home base computer 90.

As a preliminary procedure, the home base technician, by using the reflective console 91 in the slow mode, will in effect press the HALT switch twice—so the computer 10 is stopped and the console status is such that neither the HALT nor the RUN lights are on. The technician then manipulates the reflective console to set the program counter PC of the computer 10 to the known starting address of a fast mode loader subroutine previously stored in a read-only instruction memory section of the computer 10. The nature of this loader subroutine will be described below.

The technician then artificially actuates the DA switch and the RUN switch. The computer 10 then executes preliminary steps of its fast loader routine and halts the program counter to await the arrival of a fast message. The technician then makes a manual entry (by a switch or the teletypewriter) to set a flag in the home base computer conditioning the latter to execute a stored subroutine of program instructions for sending fast messages.

By the programming instructions in the latter subroutine, a predetermined "arm fast code" eight bit word is taken from memory, sent to the UART 89a (FIG. 6) and transmitted as a first character in the fast mode message to the microcomputer 82. For sake of discussion, the fast arm code may be considered as arbitrarily representing the numerical value of, say, "255" (i.e. 11111111). In any event, the fast arm code is chosen so that it differs from the slow arm code and any eight bit character combinations which can occur in the slow mode.

Second and third eight bit characters are then formed in the computer 90 to collectively represent a sixteen bit word which numerically indicates the starting address aaa of the main computer's memory section into which the successive instruction words of a diagnostic program are to be placed. These second and third characters are transmitted bit-by-bit through the UART 89a in rapid sequence.

Thereafter, the upper half (eight bits) and the lower half (eight bits) of the first word of the diagnostic program are read in succession from their memory in computer 90 and fed to the UART 89a. The latter in response transmits fourth and fifth characters to the microcomputer 82, such characters representing exactly the first word of the program to be transferred. Immediately in succession, the second word of the diagnostic program is used to form and transmit sixth and seventh eight bit characters which are transmitted to the computer site. The process continues on successive sixteen bit diagnostic program words until the last word has been transmitted. Thus, a fast mode message begins with a first "fast arm" character, second and third characters representing the memory location at which the first word of the diagnostic program is to be stored in the computer 10, and many successive pairs of characters representing, in machine language of the computer 10, the successive words of the whole program (or multi-word set of information) to be transferred.

At the microcomputer 82, the fast arm character is received by the UART 104, converted into a parallel eight bit word, recognized and used to set a fast mode flag which conditions the microcomputer to follow its stored instruction routines for the fast mode, as contrasted to the slow mode.

When the second character of the fast message is received in the UART 104 (FIG. 5) it is converted into a parallel eight bit word and stored in a particular memory location which will here, for purposes of discussion, be called word W.

Thereafter, the word W is examined bit-by-bit, starting with the lowest order bit place b1. If bit b1 contains a 1, a six bit word is pulled from memory and sent to output memory word A, the lowest bit being a 1 (for strobe) and the next five bits being a five place code for r1, r2, r4, $\overline{c1}$, $\overline{c2}$ corresponding to SW1. In net effect, as seen by the interface 10b, the switch SW1 is depressed as a result of the signals sent from word A onto conductors $\overline{C2}$, $\overline{C1}$, R1, R2, R4 (FIG. 4a). That is, the signal pattern of column (4) in Table I for the switch SW1 is created momentarily. But if the bit b1 of word W contains a 0, such code for switch SW1 is not supplied to word A, but instead the next higher bit place b2 of word W is examined. If it contains a 1, a code for the switch SW2 is sent to word A, with a 1 in the lowest place of the code for a strobe signal at ST; otherwise, the next higher third bit place b3 of word W is examined. This bit-by-bit testing for the presence of 1's in the word W is continued until all eight bits have been treated and corresponding switch code signals (for switches SW1-SW8) have been sent (or not sent) to the word A output lines. Following those eight operations, the next program instruction in the microcomputer memory causes a code corresponding to the STORE switch SW17 to be sent to word A of memory with a 1 for strobe. In the next operation, the microcomputer pulls from memory a code corresponding to the RUN, switch SW20, and sends it to the output memory word A with a 1 for the bit ST.

In other words, fixed equivalent codes each containing five bits herein previously designated $\overline{c1}$, $\overline{c2}$, r4, r2, r1 corresponding to switches SW1 to SW8, SW17 and SW20 have been pre-stored in the ROM memory locations of the microcomputer 82. As the first character of a character pair is processed, certain ones of the codes for switches SW1 to SW8 will be successively placed in output word A so that the corresponding artificial switch code signals will be sent to the interface conductors of the computer 10, those ones of the switch codes so signaled successively corresponding to the bit places in word W which contain a binary 1. Thereafter, codes for the STORE and RUN switches are supplied. Merely as a specific example, assume that an eight bit character in word W is 01010101. As that word is examined bit-by-bit, codes for switches SW1, SW3, SW5 and SW7 will be sent to word A. The code word for SW3, for example, will be—100001 (the six lower bits for $\overline{c2}$, $\overline{c1}$, r4, r2, r1, ST) and the eleven conductor pattern (including ST) of signals resulting in FIG. 4a for $\overline{C3}$, $\overline{C2}$, $\overline{C1}$, $\overline{C0}$, R6, R5, R4, R3, R2, R1, ST will be 10110000001—as indicated in column (4) of Table I.

When the third character of a fast message is received in the microcomputer 82, it is transferred in similar fashion to the word W location. This third character is examined bit by bit in the manner described above, and codes corresponding to some or all of the switches SW1 through SW8 are pulled from the read-only memory and fed into the word A location for output to the computer console conductors. After such eight operations on the third character, code signals for STORE and RUN are successively fed into the output memory word A location.

In effect, therefore, it will be seen that in response to a pair of eight bit characters received through the UART 104, the microcomputer 82 sends signals to the console interface to cause "artificial" actuation of those ones of the switches SW1 through SW8 according to the presence of binary 1's in a sixteen bit program word (taken 8 bits at a time) represented by the pair of eight bit characters. In this way, the sixteen bit program word is reproduced in the computer 10, as explained more fully below.

After the second and third characters of a long, fast mode message have been so received and treated, successive pairs of characters (fourth and fifth, sixth and seventh and so on) are received through the UART 104 in the microcomputer 82—each pair corresponding to one sixteen bit word of the diagnostic program which is to be transmitted from home base to the computer. Each character is converted by the microcomputer 82 into a succession of artificial switch actuation codes corresponding to respective ones of the switches SW1 to SW8, according to the presence of a binary 1 in the successive higher order bit places of the original program word. After each such character has been examined to create the proper succession of artificial switch actuation codes, codes for STORE and RUN are sent to the interface conductors.

The response in the computer 10 to the fast mode message may now be considered. The first character (arm fast mode) of that message is utilized solely in the microcomputer 82 and produces no effective signals to the computer interface conductors. The computer 10 prior to the start of a fast mode message has been conditioned, as explained above, so that the DA lamp is on and the program counter has been halted under the influence of the fast loader program. Successive sets of artificial switch actuation codes resulting from processing of the second message character in the microcomputer 82 are entered into the eight lower bit places of the S register 65. Then, the arrival of an articial switch actuation code for STORE causes transfer of those bits from the S register to the DA register. The subsequent arrival of artificial switch actuation signals for RUN starts the program clock and resumption of progression through the fast loader program. Under the control of that program, the contents of the DA register are transferred to the upper half of an active memory location which will here be called a scratch pad register. After such transfer, the fast loader program halts the program counter PC. As successive artificial switch closure codes for the third character (representing the lower half of a sixteen bit word) of a fast message are received, they are stored in the lower eight places of the S register 65. The artificial codes for STORE and RUN which follow cause the contents of the S register to be transferred into the DA register and the program counter to start so that the fast loader program advances through its subsequent steps. By those steps, the contents of the DA register are taken onto the system bus and stored in the lower eight bit locations of the scratch pad register and the fast mode loader again stops the program counter PC. The scratch pad register now contains a sixteen bit word which represents the starting address for a group of successive memory locations in which the diagnostic program, to be received, is to be placed.

As the fourth and fifth characters of a fast mode message are manifested by artificial switch closure signals, those artifical codes of the fourth character will cause entry of 1's into certain ones of the eight lower order bit locations in the S register 65, and the subsequent receipt of an artificial STORE code will transfer the S register contents to the DA register. In response to the subsequent artificial RUN code, the program counter is started and the fast loader program resumes to take the contents of the DA register and store those contents in the upper eight bit places at the memory address location then signaled by the scratch pad register. Similarly, as the artificial switch codes for the fifth character are received, they are entered into the lower eight bit locations of the S register, the subsequent STORE code causes their transfer to the DA register, and the subsequent RUN code causes the program counter to continue the fast loader program. Its steps cause the contents of the DA register to be transferred to the lower half of the memory location whose address is then signaled by the scratch pad register. The fast loader program then increments by one the contents of the scratch pad register and again stops the program counter.

As the sixth and seventh character signals are received on the interface conductors, the response is the same as that described above for the fourth and fifth character signals, except that storage into memory is at a location whose address is one unit higher than that of the address to which the contents of the fourth and fifth characters were stored. In other words, a sixteen bit word corresponding to the second word of the diagnostic program being sent from home base to the computer 10 is represented by the sixth and seventh characters transmitted over the telephone line and processed through the microcomputer 82. These result in an identical pattern of sixteen 1's and 0's being stored into the second location of the memory location group in the computer 10 at which the entire diagnostic program is to be located.

Thereafter, as successive pairs of character signals are received on the interface conductors, the operation described above is repeated, with the scratch pad register contents being incremented by one so that each of the successive words of the diagnostic program is stored at the next higher order address location of the computer memory. The fast mode loader program of instructions has been described above in terms of the sequences which occur. These are elementary in nature and from such description one skilled in the art will readily understand, and be able easily to prepare and insert, the required fast loader subroutine.

It will be seen that in the fast mode of information transfer, a large number of sixteen bit words may be transferred in identical form from the home base to the computer 10 and located at a desired portion of the latter's memory. In the fast mode, each binary 1 contained in a sixteen bit program word is transmitted over the telephone link as a single pulse, and is caused to create an artificial switch actuation code which in turn creates a binary 1 at the corresponding bit location in a memory word of the computer 10. Thus, the operation of artifically "pushing a switch" in the fast mode does not require the transmission of five time-spaced pulses over the telephone communication link (as in the slow mode), but such codes are formed automatically within the separate microcomputer 82.

The Structure of the Microcomputer As Formed By Its ROM Instruction Program

With the foregoing in mind, the fixed program built into the ROM instruction portion of the microcomputer 82, and which thus in part determines its structural organization, may now be described with reference to FIGS. 7a and 7b. As there illustrated, the microcomputer program omits some refinement details which are non-essential, but represents an exemplary embodiment complete in all essential respects.

After the microcomputer has been "plugged into" the console of the computer 10 (by means such as the connector J1, P1), and power is turned on, it runs as a free-standing device—accepting pulse trains on its input line 104a, sending out pulse trains on its output line 104b, accepting input bit signals on its memory lines for words B-E (from console lamps), and sending out coded "switch actuating" signals on its memory lines for word A.

The repairman at the computer site may set the selector switch $M_S$ to, in effect, turn the microcomputer off or to select either a local mode (making $M_L=1$) or a remote mode (making $M_R=1$). In the local mode, the reflective console 91 at home base only monitors the lamps L1-L28 at the console 10a, and actuation of the remote console switches will have no effect. This mode is provided to prevent any acts at home base from changing the status of the console 10a. The technician at home base may, by voice communication over a second telephone line, instruct the repairman to depress certain switches on the console 10a or to otherwise feed data or status changes to the computer 10—the technician observing the results on the reflective console lamps. In the remote mode, the technician at home base may cause the switches of the console 10a to be "artificially actuated"—and in either the slow mode (depressions of the reflective console switches) or the fast mode (transferring a whole series of whole sixteen bit words orginially stored on magnetic disks, punched tape or in the memory of the computer 90).

Local Mode

With reference to FIGS. 7A, B, the local mode will first be described. When power is first turned on, program steps shown at 110 normalize the microcomputer by clearing all data words and setting word A to its normall xx110000, which is the code for "no switch to be artificially actuated". This is an ordinary start-up procedure. On subsequent steps at 111, the bit $M_L$ is pulled from memory, and compared to 1 to determine if switch $M_S$ (FIG. 5) is calling for the "local mode" described above. If the local mode is selected, then the program progresses to steps shown at 112, 114: wherein the fast and slow arm flags (to be described) are cleared and the word W is cleared (redundantly in the present case).

The program sequence proceeds then from flow chart line 115 to that portion which is associated with periodically sending messages to home. By steps shown at 116, a word of memory (arbitrarily here called P) used as a character counter is compared to zero, in order to determine if the last character of a preceding four-character message has been completed. It will be assumed initially that P is found equal to zero, so the sequence proceeds to steps at 118 where another word of memory RTC2 is examined. The latter is used as a No. 2 "real time clock" word to assure that a predetermined minimum time gap (about 1.5 times the interval required for one character transmission) exists between successive messages to home,—this being done so that the home base computer and its UART 89a may positively identify the first character in each four character message. That word is cleared to zero at the end of each message and incremented each time a clock pulse from the baud clock 103 (FIG. 5) appears. Unless it has reached the count of twelve when RTC2 is examined, then the time gap since the end of the previous message has not yet run out. In that event, the program proceeds to a loop line, and loops back to 111 to begin another cycle.

If the word RTC2 is greater than 12, however, the "yes" at 118 causes a progression through steps illustrated at 120 and 121. The "lamp signals" appearing on input lines forming words B, C, D, E are successively transferred to data memory words I, J, K, L—and thereafter the character counter word P is set to 4. The program sequence then loops to begin anew at 111 and will progress through 112, 114, 115 as described—to find at 116 that the word P (now being 4) is not equal to zero. Thus, the step progression is routed to sequence 124, where the "buffer empty" signal from UART 104 is examined. The UART has a buffer and active register for holding characters to be transmitted and produces a "buffer empty" signal when it is ready to accept the next character. If that signal is absent, the system proceeds to 119 and loops through another program cycle. But if the UART is ready to receive an eight bit character word, the system proceeds to the sequence shown at 125 where one of four operations transpires in response to sensing of the P word:

(a) If P=4, the word I is taken from memory and transferred to the UART for transmission as an eight-place pulse group character;
(b) If P=3, the word J is so taken;
(c) If P=2, the word K is so taken;
(d) If P=1, the word L is so taken.

Next, if P=1, the real time clock word RTC is cleared to zero, since the fourth character of a message will have just been processed. This is indicated at 126 in FIG. 7b, followed by an operation at 128 which reduces the word P by 1.

In the first pass through program steps at 125, P will be 4 (having been so set at 121), the word I will be sent to the UART transmission buffer, the steps at 126 will have no effect (since P=4), and the step at 128 will change P from 4 to 3. Then the program loops for another cycle, arriving at 125 to find P=3, so word J is transferred to the UART, and at 128 the counter word P will decrement to 2. On the next cycle, word K will be sent to the UART and P will be changed to 1. And on the fourth cycle, the word L will be placed in the UART at 125, RTC 2 will be cleared at 126 and P will be decremented to 0 at 128.

Of course, after each word is placed in the UART 104, it sends a time-spaced pulse group over the line 104b, and the branching at 124 defers the transfer of the next word into the UART until the latter's transmit buffer is ready to accept it. In this fashion, repeated loops through the microcomputer will cause one four character message to be transmitted to the home base where, as previously described, it updates the latter's "lamp bit memory" and the lighted status of the lamps on the reflective console 91.

After one such message has been sent, and P=0, progression on the next cycle is from 116 through 118 and (if RTC 2 indicates that a minimum time gap has elapsed) through 121 to set up for the automatic transmission of the next lamp status message to home.

As shown in the lower portion of FIG. 7b, two real time clock words RTC 1 and RTC 2 are incremented at 129 by an interrupt subroutine entered in response to each baud clock pulse. Thus, when RTC 2 is cleared at 126, it will not exceed a count of 12 until 12 baud clock pulses (equal in time to about 1½ character intervals) have occured. In this way, minimum time gaps are placed between successive messages.

In the local mode, the microcomputer steps shown in the right portion of FIG. 7a are bypassed by branching at 111, and the signals of the S and F registers (which turn on or off each of lamps L1–L28) are periodically transmitted back to the reflective console lamps at home base. Any change in the S register, as different words within the computer 10 are brought to it, by local manipulation of the switches SW1–SW28, are immediately shown at home base. An expert standing before the reflective console may observe the lamps as if he were standing in front of the console 10a.

Remote, Slow Mode

Let it be assumed now that switch $M_S$ (FIG. 5) has been placed in its remote position so that signals $M_L=0$ and $M_R=1$. As a loop cycle begins, the program steps progress from 111 to an examination of $M_R$ at 130. If neither $M_L$ nor $M_R$ is 1, the microcomputer simply loops through steps 111, 130, 110 in an off or standby condition. But with $M_R=1$, the program sequence progresses from 130 to 131 where the "received word ready" signal from UART is examined.

The system is set up so that if no incoming character arrives in the UART 104 for a predetermined time interval (on the order of the time required for transmission of one pulse group) it is known that the last-received message has been completed,—or at least that the next word received must be treated as the first character of a received message. Thus, from the steps illustrated at 131, if the UART does not hold a received word ready to be processed, the step at 132 is executed to examine the data memory word RTC 1 used as a timing clock.

Assuming that RTC 1 was cleared when the previous character was received and ready in the UART 104, and recalling that RTC 1 is incremented by baud clock pulses at interrupt step 129, the value of RTC 1 will be less than 9 if less than one character time has expired. In this case the program proceeds from 132 to 115 to again perform the message to home portion and then loops. If such looping repeats a sufficient number of times, finding (at 131) no received word ready in the UART, until RTC 1 exceeds 9, then from 132 the program will proceed to 112 and 114—clearing the previously set slow or fast arm flag. In this route, the "send message home" subroutine is entered at 115, and the cycle will thereafter loop back to 111.

It may be assumed next, however, that the first character of a slow mode message to home has just been received, so that at step 131, a "yes" response occurs. On the succeeding step 134, the real time clock word RTC 1 is cleared, after which at 135 the eight bit word in the UART receiver register is transferred to memory word W. After this transfer at 135 the UART "word ready" signal is cleared. This being (by the assumption here made) the first word of a received message, the microcomputer does not known whether it is a fast or slow mode message—but such first word of any valid message will contain either a slow arm or a fast arm code. Thus, from 135 the system proceeds to 136 to see if a fast mode flag (a specified bit) has been set. Finding it cleared, the progression is to 138 for a test to see if the slow mode flag has been set. Finding the latter cleared, the program progresses to a test at 139 by which the first character received is compared to the "arm fast mode" code which may be pre-established in a certain word of the ROM memory. On the assumption here made the comparison will prove negative, so the system goes to steps at 140 by which the word W (containing the first word of a received message) is compared to the pre-established slow arm code in a specified word of read-only memory. If that test turns out negative, some error condition exists and that word, as well as those following, cannot be accepted until either a fast or slow arm code is in fact received. Thus, a negative result at 140 permits the system to proceed redundantly through steps 112, then to clear the word W and to go on via line 115 to service the "message to home" routine shown in FIG. 7b.

But if, as here assumed, the test at 140 finds the contents of word W to agree with the slow arm code, then the slow mode flag is set at 141 before entry via 115 to the "message to home" routine. After looping from 119 to 111, the progression is the same as above described through 111, 130 to 131. If the second word of the slow message (representing an artificial switch closure code) has not been received, the system sub-loops through 132, 115, 119, 111 until such second word is found ready (unless RTC 1 in the meantime reaches a count greater than 9). When the second word is found ready at 131, progress is through 134 (clearing RTC 1) and 135—transferring the second received character to word W. At 136, the fast mode flag is found off, but at 138 the slow mode flag is found set—so steps illustrated at 142, 143, 144, 145 are performed in sequence to send artificial switch actuation signals to the console 10a. More specifically, at step 142 a binary 1 is written into the first bit b1 of word W—so that subsequent transfer of that word to word A will produce a strobe pulse on ST. When, at 143 the word W is transferred to word A, so that artificial switch signals are sent to the console interface 10b—as previously described. Those signals, as noted above, have a code which uniquely identifies the particular reflective console switch pressed to form them at the home base computer 90, and they produce the same effect in the computer 10 as if the corresponding switch on the console 10a had been pressed.

From step 143, waiting steps are performed at 144 to measure off a predetermined number of cycles of the microcomputer clock 100, and thus to determine the duration of the code signals via word A to the console 10a. If, for example, the computer 10 is fast enough to accept artificial switch closures (recalling that the filter 62 in FIG. 4a is bypassed) at a rate of 1200 per second, then the switch code signals may be made in length to produce about a 50% on-off duty cycle (for the fast mode to be explained) and thus the "wait" time will be made on the order of 1/2400 second. After such wait at 144, the word A is "cleared to normal" at 145—i.e., is set to xx110000. From there the program proceeds via line 115 to the "message to home" portion described above with reference to FIG. 7b.

It is virtually impossible for a human at home base to manually actuate reflective console switches in such rapid succession that the next two-character slow mode message will arrive before the counter word RTC 1 exceeds 9 after the second character of the preceding message has arrived. Thus, the steps at 132 will result in progression through the steps at 112, 114 after one slow mode message is received and before the first character of the next arrives. This means that the slow mode flag will have been cleared—and so the first arriving code character of the next message will (by program step at 141) reset the slow mode flag before the second character arrives.

From what has been said, however, it is now clear that as successive slow mode messages from home are received, the microcomputer 82 will convert each one into an "artificial" actuation of a switch in the console 10a, the particular artificially actuated switch corresponding to the counterpart switch on the reflective console whose actuation produced the slow mode message.

It is now apparent also that in the remote, slow mode of operation, the "messages to home" are always periodically sent—interleaved and in part simultaneously with slow mode messages coming from home. As stated earlier, therefore, the reflective console 91 at home base becomes usable by a technician there just as if he were at the computer 10 and using the console 10a.

Remote, Fast Mode

Let it be assumed now that the microcomputer 82 is waiting to receive from home (and is periodically sending messages to home) with its switch $M_S$ in the remote position ($M_R = 1$)—and that a fast mode message begins to arrive.

The first character received in the UART 104 is an "arm for fast mode" code. As the microcomputer program steps proceed from 111 to 130 to 131 to 134, that fast arm code will be placed at word W on step 135. Then, at steps 136 and 138 neither the fast nor the slow mode flag will be found set. But at set 139, the contents of word W will be found equal to the fast arm code, so the system will proceed to step 148—and set the fast mode flag. From there, the "message to home" (FIG. 7b) program section is executed, followed by a loop to 111. On a subsequent pass through the program cycle (perhaps after temporary diversion occurs from 131 and 132 to 115 to 119 and back to 111 for a few cycles until the second character is ready in the UART), the progress will be via steps 130, 131, 134, 135 to step 136. With the second character of the message now in the memory word W, the fast mode flag will be found set at step 136—so that fast mode procedures will be performed beginning at 150 as shown in FIG. 7a.

A data word of memory (here arbitrarily called word N) is employed as a bit counter to count off the sensing of the successive bits of word W. At step 150, word N is set to hold the number 1. By steps described at 151, the contents of word N are employed to dictate the sensing of a particular bit in word W to determine if it holds a 1. If not, there is a jump to step 155. But if so, the system proceeds to step 152 where the value of word N is used to select from memory a pre-stored code word corresponding to the "artificial" code for switch $SW_n$ (where n designates the number then in word N)—such code word then being transferred into word A. For example, if $N=4$, a code word for SW4 is transferred to word A. Each of the eight prestored code words for SW1 to SW8 has a binary 1 in its lowest bit place, so that the transfer to word A will produce a strobe signal on line ST (FIG. 5).

From 152, the system waits at 153 and then clears word A to its normal value at 154—thereby making the duration of the artificial switch signals sent to console 10a have a desired duration (e.g., 1/2400 second) as previously described.

At step 155, the N word is incremented by one unit—this being entered from 151 if the examined bit of word N is 0, or from 154 if the examined bit of word N is 1 and a switch code has been sent to word A. Then, at step 156, the value in word N is sensed to see if it is greater than 8; if not the system returns to step 151—to work on the next higher bit place of word N in the same manner. A switch code for $SW_n$ will be sent to word A if that bit is a 1 (after which word N is incremented) or word N will be directly incremented. This sub-loop will be repeated eight times to deal with the eight bits of word N, after which step 156 will produce a "yes" result—so that the system proceeds to step 157.

Switch code words having been sent to word A (and to the console 10a) corresponding to the 1's of the message characters in word W, then at steps labeled 157, a prestored code word for the STORE switch is fed to word A, a waiting period is measured off, word A is cleared to normal, a prestored code word for the RUN switch is transferred to word A, another waiting period is measured off, and word A is again cleared to normal. The program proceeds to line 115 and the "message to home" portion (FIG. 7b), thereafter looping to re-cycle.

On some subsequent cycle, the UART will be found at step 131 to have the next fast meassage character ready in its receive register. That next character will thus be handled by steps 134, 135, 136 and 150-157 in the same fashion described for the previous character. Thus, each character of a fast message is transferred to the lower half of the S register in the computer 10. From there it is treated as previously described.

If there is a delay of more than one character time interval between the receipt of successive characters, then the response at step 132 will be affirmative and the fast mode flag will be cleared at step 112. This signifies the end of a fast mode message, or some malfunction in its transmission if it is not the end. If the next character received is neither a slow arm or fast arm code, and a negative response appears from step 140, an error condition may be signaled.

From the foregoing, the structure and operation created by the read-only program instructions in the microcomputer 82 will be fully understood—and the transmission of repeated messages to home (in the local or the remote-slow or remote-fast modes) will be clear. The artificial actuation of switches in the computer 10 will be seen to occur in response to either slow mode or fast mode messages from home, the former mode making the reflective console a complete counterpart of the computer console for use by a technician at home base.

RESUME

The present invention brings to the art a simple and effective system for sending data, instructions or other information by telephone line (or similar communication link) between two computers. It permits computers in the field to be monitored, tested, diagnosed, or operated by a technician at a home base. The reflective console may be manipulated and observed with the same effect as if the technician were physically in front of the distant computer's console; and whole programs (diagnostic or otherwise) may be sent from home to the distant computer, or vice versa. This is accomplished by simply "tapping in" to the conductors of the computer console and the use of a small (even easily portable) special purpose microcomputer.

We claim:

1. In a system for entering information into and taking information from a digital computer by intelligence transmission over two channels, the combination comprising
  (A) a digital computer including a clock, control unit, arithmetic unit, system bus, memory and address trunk,
  (B) said computer further including and being characterized by
    (1) a console and console interface for entering information in machine language and displaying information from various computer locations in machine language, said console and interface comprising
      (a) a plurality of switches for entry of word and function signals sequentially one bit at a time,
      (b) a plurality of bit indicators associated with respective ones of said switches,
  (C) said computer and interface together constituting
    (1) means responsive to signals from said switches for setting up any desired binary word and thereafter transferring said word to different memory locations or registers within the computer,
    (2) means for supplying to said indicators binary bit voltages to turn the indicators on or off according to the respective bit values of a selected word within the computer,
  (D) means coupled to said indicators and responsive to the bit voltages applied thereto for periodically creating in sequence time serialized message pulse trains with respective time locations having a binary value of a corresponding one of said indicators,
  (E) means responsive to a received time serialized pulse train, formed according to a predetermined code so that any train may correspond to one of said switches, for creating in said console the same signals as if the switch represented by the code of the train had been closed,
  (F) means for transmitting to a base remote from said computer, via a communications link, the pulse trains created by said means (D),
  (G) means for transmitting from said base to same means (E), via a communications link, successive pulse trains which are respectively coded to correspond to successive ones of said switches whose effective actuation is desired, and
  (H) means at said base responsive to pulse trains received from said means (F) for converting the serial pulses of each train into a signaled binary word which is indicative of the states of said indicators at that time.

whereby binary words displayed by the indicators at said computer are dynamically signaled at said base and changes in said computer, including its console indicators, may be effected from the base as if the computer's console switches were physically manipulated.

2. In a system for operating or diagnosing a digital computer from a home base displaced from the computer site, the combination comprising (A) a computer including memory for instruction and data words, a control unit, an arithmetic unit, a system bus, and a console; said console having
  (1) a plurality of switches for manual entry of instruction, data or address words in binary machine language,
  (2) a plurality of lamps excitable to display a word in binary machine language,
(B) said computer further including
  (1) a display register,
  (2) means responsive to actuation of said switches to create successive sets of binary signals on a first set of conductors, each set representing in a predetermined code the particular switch actuated,
  (3) means for applying over a second set of conductors binary voltage signals to said lamps to turn each lamp on or off according to the presence of a 1 or 0 binary signal in a corresponding bit location of said display register,
  (4) means for entering into said display register a binary word corresponding in its bits to the different binary voltage signals on said first set of conductors resulting from actuation of said switches,
  (5) means responsive to certain signals produced by actuation of certain ones of said switches for transferring the contents of said display register to another register or memory location within the computer,
  (6) means responsive to certain signals produced by actuation of certain ones of said switches for transferring the contents of another register or memory location within the computer to said display register,
  (7) said means (5) and (6) being enabled or disabled by actuation of function switches included within said plurality of switches,
(C) means at the computer site and the home base, adapted for interconnection via a telephone link, to simultaneously send pulse train messages in both directions,
(D) means connected to said second set of conductors for inputting to said means (C) a first pulse train message periodically for transmission from the computer site to the home base, each first pulse train message containing time-serial bits of 0 and 1 value corresponding to the voltages on respective ones of said second set of conductors,
(E) means at said home base for inputting to said means (C) a second coded pulse train message for transmission from home base to the computer site whenever it is desired to cause any change in said computer, any such change being, in effect, as if one of said switches had been actuated,
(F) means at home base responsive to each of said first messages for displaying or indicating or recording the word represented in such message, and thus a word then in the display register of the computer, and
(G) means at the computer site responsive to any second message for applying, to said first set of conductors, binary voltage signals which, in said predetermined code, correspond to a desired switch,
whereby both instruction and data words may be sent to and from said computer from and to said home base with (i) entry into and (ii) exit out of said computer being made via (i) said first set of conductors and (ii) said second set of conductors.

3. In a system for remotely diagnosing or operating a digital computer located at a given site which is remote from a home base via a telephone link,
(A) said computer including a machine-language console having
  (1) a first set of switches corresponding to the respective bits of a word as it is signaled on the bus and in the memory of the computer,
  (2) a first set of lamps corresponding to the respective bits of a word,
  (3) a second set of function switches, and
  (4) a second set of lamps corresponding respectively to said function switches,
(B) said computer including an interface between said console and the remaining portions of the computer, said remaining portions including a control unit, arithmetic unit, memory, bus and address trunk, said interface including
  (1) a first register S,
  (2) a second register F,
  (3) a third register DA, and
  (4) gating connections to the computer bus and control unit,
(C) said computer further including
  (1) a first plurality of conductors extending between said first and second sets of switches and said interface by which closure of any switch is uniquely signaled to the interface,
  (2) a second plurality of conductors by which the contents of said S and F registers cause energization of the corresponding ones of the first and second sets of lamps to display the contents of such registers,
  (3) means for transferring via said first conductors into said S register bit signals corresponding to closures of said first set of switches, such closures then being displayed by said first set of lamps,
  (4) means for transferring into said F register bit signals corresponding to closures of said second set of switches, such closures then being displayed by said second set of lamps,
  (5) means responsive to certain function signals from said F register for transferring to said register DA the contents of said register S,
  (6) means responsive to certain other function signals for transferring to said register S the contents of a computer memory word whose address is represented by the contents of said register DA, such memory word contents then being displayed by said first set of lamps,
  (7) means responsive to still other function signals for transferring to the computer memory storage word, whose address is represented by the contents of said register DA, the contents of said register S,
whereby binary word information in any computer memory address location may be brought to display on said first set of lamps and the binary word information in any computer memory address location may be changed to agree with that fed in by manipulation of said first set of switches,
(D) a microcomputer having an input/output interface forming words of memory with connections constituting bits of such words to (1) said first plurality of conductors treated as output bits,
(2) said second plurality of conductors treated as input bits,
(E) said microcomputer including an instruction memory section, a data memory section, a microprocessor with a control unit, a universal asynchronous receiver-transmitter having an input line and output line, a main clock and a baud rate clock, said instruction memory section being physically conditioned by a stored program to constitute said microcomputer to include
(1) means for periodically feeding to the output line of said receiver-transmitter a message pulse train having serial time locations corresponding to the respective ones of said second plurality of conductors and having at each time location a binary 1 or 0 level agreeing with the binary 1 or 0 signal on that corresponding conductor, and
(2) means for differently responding to different message pulse trains arriving at the input line of said receiver-transmitter, and which according to a pre-established code correspond to and represent respective ones of said switches,
(a) said means for responding including means responsive to a received pulse train for applying to said first plurality of conductors binary level signals which produce the same effect in said computer as if the switch, corresponding to that received train, had been closed,
(F) means at the computer side and at home base for connecting to a telephone transmission line extending between the site and the base, said last-named means including
(1) means for transmitting from said site to said home base the message pulse trains appearing on said receiver-transmitter output line,
(2) means for transmitting to said receiver-transmitter input line message pulse trains originating at said home base, and
(G) means at said home base for generating message serial pulse trains which by binary levels at time locations therein according to said pre-established code, represent different ones of said switches whose effective actuation is desired.

4. In a system for entering information into and taking information from a digital computer by intelligence transmission over two channels, the combination comprising
(A) a digital computer located at a given site and including a clock, control unit, arithmetic unit, memory, and system bus,
(B) said computer further including and being characterized by
(1) a console and console interface for entering information in machine language and displaying information from various computer locations in machine language, said console and interface comprising
(a) a first plurality of switches for entry of word and function signals sequentially one bit at a time, and
(b) a first plurality of bit indicators associated with respective ones of said switches,
(C) said computer and interface together constituting
(1) means responsive to actuation of said switches for setting up any desired binary word and thereafter transferring said word to different memory locations or registers within the computer,
(2) means for supplying to said indicators binary bit voltages to turn the indicators on or off according to the bit values of a selected word within the computer,
(D) means coupled to said first indicators and responsive to the bit voltages applied thereto for periodically creating in sequence time serialized first message pulse trains with time locations each having a binary value corresponding to the state of one of said indicators,
(E) a reflective console located at a home base remote from said computer site and including
(1) a second plurality of switches which respectively correspond to different ones of said first plurality of switches,
(2) a second plurality of bit indicators associated with respective ones of said second switches and which respectively correspond to different ones of said first plurality of indicators,
(F) means at said base and responsive to the actuation of any of said second plurality of switches for creating a time serialized second message pulse train formed according to a predetermined code so that any train uniquely represents the particular switch actuated,
(G) a two channel communications link for simultaneously transmitting (i) the message pulse trains created by said means (D) to said base, and (ii) the pulse trains created by said means (F) to said computer site,
(H) means at said computer site responsive to said second message trains and coupled to said first plurality of switches for creating in said computer console the same signals as if that one of the first switches, corresponding to the code of a received second message pulse train, had been actuated, and
(I) means at said home base and responsive to said first message trains for exciting those ones of said second indicators which correspond to the binary 1's in a received first message train,
whereby said reflective console may be manipulated and observed by a technician at said base with the same effect as if he were at the computer console to manipulate and observe the latter.

5. In a system for operating or diagnosing a digital computer from a home base displaced from the computer site, the combination comprising
(A) a computer including memory for instruction and data words, a control unit, an arithmetic unit, a system bus, and a machine language console; said console having
(1) a first plurality of switches for manual entry of instruction, data and address words in binary machine language,
(2) a first plurality of lamps excitable to display a word in binary machine language,
(B) said computer further including
(1) a display register,
(2) means responsive to actuation of said switches to create successive sets of binary signals on a first set of conductors, each set of signals representing in a predetermined code the particular switch actuated,
(3) means for applying over a second set of conductors binary voltage signals to said lamps to turn each lamp on or off according to the presence of a 1 or 0 binary signal in a corresponding bit location of said display register,
(4) means for entering into said display register a binary word corresponding in its bits to the different sets of binary voltage signals on said first conductors resulting from actuation of said switches,
(5) means responsive to certain signals produced by actuation of certain ones of said switches for transferring the contents of said display register to another register or memory location within the computer,
(6) means responsive to certain signals produced by actuation of certain ones of said switches for transferring the contents of another register or memory location within the computer to said display register,
(7) said means (5) and (6) being enabled or disabled by actuation of function switches included within said plurality of switches,
(C) means at the computer site and the home base, adapted for interconnection via a telephone link, to simultaneously send pulse train messages in both directions,
(D) means connected to said second set of conductors for inputting to said means (C) a first pulse train message periodically for transmission from the computer site to the home base, each first pulse train containing time-serial bits 0 and 1 value corresponding to the voltages on respective ones of said second set of conductors,
(E) a reflective console located at said home base and having
(1) a second plurality of switches corresponding respectively to different ones of said first plurality of switches,
(2) a second plurality of lamps, corresponding to different ones of said first plurality of lamps,
(F) means at said home base and responsive to actuation of different ones of said second switches for inputting to said means (C) a second pulse train containing time-serial bits 0 and 1 value which uniquely designate, according to a pre-established code, the particular actuated second switch,
(G) means responsive to each first pulse train message received at said home base, via said means (C), for turning on those ones of said second plurality of lamps which correspond to those ones of said first plurality of lamps then on, and
(H) means responsive to each second pulse train message received at said computer site, via said means (C), for applying to said first set of conductors binary signals representing, in said predetermined code, that one of said first switches which corresponds to the one of the second switches whose actuation initiated the received second pulse train message, whereby said reflective console may be manipulated and observed with the same effect as if the computer console were manipulated and observed.

6. In a system for remotely diagnosing or operating a digital computer, located at a given site which is remote from a home base, via a two-channel communications link,
(A) said computer including a memory, a bus and a machine-language console having
(1) a first set of switches corresponding to the respective bits of a word as it is signaled on the bus and in the memory of the computer,
(2) a first set of lamps corresponding to the respective bits of a word,
(3) a second set of function switches, and
(4) a second set of lamps corresponding respectively to said function switches,
(B) said computer including an interface between said main console and the remaining portions of the computer, said remaining portions including a control unit, arithmetic unit, memory, bus and address trunk, said interface including
(1) a first register S,
(2) a second register F,
(3) a third register DA, and
(4) gating connections to the computer bus and control unit,
(C) said computer further including
(1) a first plurality of conductors extending between said first and second sets of switches and said interface by which closure of any switch is uniquely signaled to the interface,
(2) a second plurality of conductors by which the contents of said S and F registers cause energization of the corresponding ones of the first and second sets of lamps to display the contents of such registers,
(3) means for transferring via said first conductors into said S register bit signals corresponding to closures of said first set of switches, such closures then being displayed by said first set of lamps,
(4) means for transferring into said F register bit signals corresponding to closures of said second set of switches, such closures then being displayed by said second set of lamps,
(5) means responsive to certain function signals from said F register for transferring to said register DA the contents of said register S,
(6) means responsive to certain other function signals for transferring to said register S the contents of a computer memory word whose address is represented by the contents of said register DA, such memory word contents then being displayed by said first set of lamps,
(7) means responsive to still other function signals for transferring to the computer memory storage word, whose address is represented by the contents of said register DA, the contents of said register S, whereby binary word information in any computer memory address location may be brought to display on said first set of lamps and the binary word information in any computer memory address location may be changed to agree with that fed in by manipulation of said first set of switches,
(D) a microcomputer having an input-output interface forming words of memory with connections, constituting bits of such words, to
(1) said first plurality of conductors treated as output bits,
(2) said second plurality of conductors treated as input bits,
(E) said microcomputer including an instruction memory section, a data memory section, a microprocessor with a control unit, a universal asynchronous receiver-transmitter having an input line and an output line, a main clock and a baud rate clock, with said instruction memory section being physically conditioned by a stored program to constitute said microcomputer to include
- (1) means for periodically feeding to said output line a first message pulse train having serial time locations corresponding to the respective ones of said second plurality of conductors and having at each time location a binary 1 or 0 level agreeing with the binary 1 or 0 signal on that corresponding conductor, (F) a reflective console located at said home base and including
- (1) a first reflective set of switches corresponding respectively to said first main console switches (A)(1),
- (2) a first reflective set of lamps corresponding respectively to said first main console lamps (A)(2),
- (3) a second reflective set of function switches corresponding respectively to said second main console switches (A)(3),
- (4) a second reflective set of lamps corresponding respectively to said second main console lamps (A)(4), (G) means at said home base responsive to the actuation of any of said first and second reflective switches for creating a time serial second message pulse train having binary 1's and 0's at different time locations to represent uniquely, by a pre-established code, the particular actuated switch, (H) means for simultaneously transmitting over two communication channels linking said computer site and home base any (i) first message pulse train fed to said output line by said means (E)(1), and (ii) second message pulse train created by said means (G), (I) means at said home base responsive to a first message pulse train for turning on those ones of said first and second reflective lamps which correspond to those ones of said main console first and second lamps then on, and (J) said microcomputer further including means responsive to any second message pulse train, received via said means (H) on said input line, for applying to said first plurality of conductors binary level signals which produce the same effect in said computer as if that one of the main console switches, which corresponds to the particular reflective switch represented by the code of the received second train, had been actuated.

8. In a system for sending information from a digital computer to a distant home base, the combination comprising
- (A) a digital computer including a clock, control unit, arithmetic unit, system bus, and memory for instruction and data words,
- (B) said computer further including and being characterized by a machine language console and console interface having a plurality of bit indicators corresponding to the bits of a word,
- (C) said computer and interface together constituting means for applying to said indicators either of two voltage levels (1 or 0) to turn the indicators on or off according to the bit values of a selected word within the computer,
- (D) means coupled to said indicators and responsive to the voltages applied thereto for periodically creating in sequence time serialized message pulse trains with respective time locations having a binary value corresponding to the voltages on respective ones of said indicators,
- (E) means for transmitting to the distant home base the pulse trains created by said means (D), and
- (F) means at said home base responsive to each pulse train for converting the pulses thereof into a signaled binary word indicative of the states of said indicators at that time, whereby any binary word used to energize said indicators is dynamically signaled at said home base as the word, or the selection of a word, is changed.

8. In a system for sending information from a digital computer to a distant home base, the combination comprising
- (A) a digital computer including a clock, control unit, arithmetic unit, system bus, and memory for instruction and data words,
- (B) said computer further including and being characterized by a machine-language console and console interface having
  - (1) a first plurality of bit indicators corresponding to the bits of a word,
  - (2) a plurality of switches corresponding to the bits of a word,
- (C) said computer with its interface and instruction memory constituting
  - (1) means for applying to said first indicators either of two voltage levels (1 or 0) to turn the indicators on or off according to the bit values of a selected word within the computer,
  - (2) means responsive to actuation of said switches for applying to said indicators a desired pattern of voltage levels (1 or 0) to turn the first indicators on or off and set up a desired word displayed thereby,
- (D) means coupled to said indicators and responsive to the voltage levels applied thereto for periodically creating a time serialized message pulse train with respective time locations having binary values corresponding to the voltage levels on respective ones of said indicators,
- (E) means for transmitting to the distant home base the pulse trains created by said means (D),
- (F) means at said home base responsive to each pulse train for converting the pulses thereof into a signaled binary word indicative of the states of said indicators at that time,
- (G) a second plurality of indicators at said home base each corresponding to one of said first indicators, and
- (H) means for applying to said second indicators the bit signals of the binary word signaled by said means (F), whereby said second indicators monitor and reflect the display on said first indicators.

9. The combination set forth in claim 8, further including means for incrementing one unit at a time the address of a word selected to control said means (C).

10. In a system for sending information from a digital computer to a distant home base, the combination comprising
- (A) a digital computer including a clock, control unit, arithmetic unit, system bus, and memory for instruction and data words, (B) said computer further including and being characterized by a machine-language console and console interface having
  (1) a display register,
  (2) a first plurality of indicators corresponding to the bits of a word,
  (3) a plurality of conductors extending between the respective bit locations of said register and said indicators to apply to the latter either of two voltage levels (1 or 0) to turn the indicators on or off according to the bit place values of a word in said register, and
  (4) means for placing in said register any selected word within the computer,
(C) a microcomputer having a plurality of memory bit input lines respectively coupled to said conductors and containing an instruction program by which it constitutes means for periodically sensing the voltage levels on said conductors and for creating a serialized message pulse train with respective time locations having binary values corresponding to voltage levels on respective ones thereof,
(E) means for transmitting to said distant home base the pulse trains created by said means (C),
(F) means at said home base responsive to each pulse train for converting the pulses thereof into a signaled binary word indicative of the states of said indicators at that time,
(G) a reflective console at said home base and having a plurality of second indicators each corresponding to one of said first plurality of indicators, and
(H) means for applying to said second indicators the bit signals of the binary word signaled by said means (F),
whereby said second indicators monitor and reflect the display on said first indicators.

11. In a system for entering information into a digital computer from a distant home base, the combination comprising
(A) a digital computer including a clock, control unit, arithmetic unit, system bus, and memory for instruction and data words,
(B) said computer further including and being characterized by a machine language console and console interfce with
  (1) a plurality of switches for entry of word and function signals one bit at a time,
  (2) a plurality of conductors extending from said console to said interface, and
  (3) means responsive to actuation of any one of said switches for applying to said conductors input signal sets which correspond uniquely to the actuated switch in a predetermined code,
(C) means for transmitting from said home base to the site of said computer signal messages which identify those of said switches whose successive actuation is desired, and
(D) means responsive to said signal messages for applying to said conductors input signal sets which, in said predetermined code, correspond to those successive switches identified in the transmitted messages,
whereby the received messages produce the same effects as if the corresponding ones of said switches were actuated.

12. In a system for entering information into a digital computer from a distant home base, the combination comprising
(A) a digital computer including a clock, control unit, arithmetic unit, system bus, and memory for instruction and data words,
(B) said computer further including and being characterized by a machine-language console and console interface having a plurality of switches actuatable to set up in the computer values of respective bits of a multibit word, with means responsive to the actuation of any one switch for producing on a plurality of conductors a set of input signals uniquely identifying that switch according to a predetermined code,
(C) means responsive differently to different time-spaced trains of pulses, designating different successive ones of said switches according to a pre-established code, for producing successive sets of input signals on said plurality of conductors and representing the same ones of said switches in said predetermined code, and
(D) means for transmitting from said home base to said means (C) trains of time-spaced pulses representing in said pre-established code the successive ones of said switches whose figurative actuation is desired,
whereby said computer responds to the transmitted trains of pulses as if the switches represented by such trains were physically actuated.

13. In a system for entering information into a digital computer from a distant home base, the combination comprising
(A) a digital computer including a clock, control unit, arithmetic unit, system bus and memory for instruction and data words,
(B) said computer further including and being characterized by a machine-language console and console interface having a plurality of switches selectively actuatable to set up in the computer the respective bits of a multibit word, with means for creating a unique combination of input signals on a plurality of conductors, according to a predetermined code, in response to actuation of each switch,
(C) means responsive to received serialized pulse trains having pulses in certain time locations thereof and which represent, in a pre-established code, any one of said switches, for supplying to said plurality of conductors a combination of input signals which correspond, in said predetermined code, to the particular switch represented in the pre-established code by the received pulse train, and
(D) means for transmitting from a distant home base to said means (C) a serialized pulse train each time it is desired to produce in said computer the same effect as the physical actuation of a certain one of said switches, said transmitted pulse train representing in said pre-established code the said certain one of said switches.

14. The combination set forth in claim 13 further characterized in that said means (D) transmits said pulse train in the form of character groups of pulse time locations, and by said pre-established code certain groups identify any particular switch by the presence or absence of pulses in the different time location combinations for the group.

15. The combination set forth in claim 13 further characterized in that said means (D) transmits said pulse train in the form of character groups of pulse time locations, each location by the presence or the absence of a pulse therein calling for the artificial actuation or the lack of artificial actuation of a different one of said switches, and said means (C) includes means for producing input signals in response to the receipt of each pulse, the input signals representing a particular one of said switches which corresponds to the bit place of the time location of that received pulse.

16. In a system for entering information into a digital computer from a distant home base, the combination comprising
- (A) a digital computer including a clock, control unit, arithmetic unit, memory and system bus,
- (B) said computer further including and being characterized by a machine-language console having a first plurality of switches for entry of word and function signals one bit at a time, a plurality of conductors, and means responsive to the actuation of each switch for producing a unique combination of in-going signals on said plurality of conductors,
- (C) means at said home base for transmitting to the computer site a group of time spaced pulses which, by the coded combination of pulses in the time locations of the group, identifies any one of said plurality of switches, and
- (D) means responsive to the receipt of a group of time-spaced pulses from said means (C) for producing on said plurality of conductors a combination of in-going signals corresponding to that one of said switches which is identified by the coded combination of the received group of pulses.

17. In a system for entering information into a digital computer from a distant home base, the combination comprising
- (A) a digital computer including a clock, control unit, arithmetic unit, memory and system bus,
- (B) said computer further including and being characterized by a machine-language console having a first plurality of switches for entry of word and function signals one bit at a time, a plurality of conductors, and means responsive to the actuation of each switch for producing a unique combination of in-going signals on said plurality of conductors,
- (C) a reflective console at said home base and having a second plurality of switches each corresponding to one of said first switches,
- (D) means at said home base, and responsive to actuation of any second switch, for transmitting to the computer site a group of time spaced pulses which, by the coded combination of pulses in the time locations of the group, uniquely identifies the actuated second switch, and
- (E) means responsive to the receipt of a group of time spaced pulses from said means (D) for producing on said plurality of conductors a combination of in-going signals corresponding to that one of said first switches whose counterpart second switch is identified by the coded combination of the received group of pulses.

18. In a system for operating or diagnosing a digital computer from a home base displaced from the computer site, the combination comprising
- (A) a computer including memory for instruction and data words, a control unit, an arithmetic unit, a system bus, and a machine-language console; said console having
  - (1) a first plurality of switches for manual entry of instructions, data, and address words in binary machine language,
- (B) said computer further including
  - (1) a display register,
  - (2) means responsive to actuation of said switches to create successive sets of binary signals on a plurality of conductors, each set representing in a predetermined code the particular switch actuated,
  - (3) means for entering into said display register a binary word corresponding in its bits to the different sets of binary voltage signals on said conductors resulting from actuation of said switches,
  - (4) means responsive to certain signals produced by actuation of certain ones of said switches for transferring the contents of said display register to another register or memory location within the computer,
  - (5) means responsive to certain signals produced by actuation of certain ones of said switches for transferring the contents of another register or memory location within the computer to said display register,
- (C) means for sending pulse train messages from said home base to the computer site,
- (D) a reflective console located at said home base and having
  - (1) a second plurality of switches corresponding respectively to different ones of said first plurality of switches,
- (E) means at said home base and responsive to actuation of different ones of said second switches for inputting to said means (C) a pulse train message containing time-serial bits of 0 and 1 value which uniquely designate, according to a pre-established code, the particular actuated second switch, and
- (F) means responsive to each pulse train message received at said computer site, via said means (C), for applying to said plurality of conductors binary signals representing, in said predetermined code, that one of said first switches which corresponds to the one of the second switches whose actuation initiated the received pulse train message, whereby the first plurality of switches may be artificially actuated by physical actuation of the counterpart second switches at the home base.

19. In a system for sending data or instruction words into a computer from a home base remote from the computer site, the combination comprising
- (A) a digital computer having a clock, control unit, arithmetic unit, system bus, memory and address trunk,
- (B) said computer further having and being characterized by
  - (1) a machine-language console and console interface having
    - (a) a plurality of switches $SW_1$-$SW_N$ each corresponding to one bit in a multibit word,
    - (b) means for producing on a plurality of conductors a set of input signals unique to each switch when it is actuated, and
    - (c) means responsive to each set of input signals on said conductors for setting or affecting the bit place, corresponding to the actuated one of said switches, in a register,
- (C) means at said home base for transmitting pulse train groups of time-spaced pulses to the site of said computer, each group of said pulses representing by 1's and 0's in different ones of its N bit places, the 1's and 0's of bit places in a word to be entered into said computer, and (D) means at the computer site responsive to a pulse train group received from said means (C), including
  (1) means responsive in time succession to each progressively higher order bit place $b_n$ of the group of pulses which contains a 1 for applying to said plurality of conductors a set of signals unique to the corresponding switch $SW_n$ of said switches $SW_1$–$SW_N$.

20. In a system for sending data or instruction words into a computer from a base remote from the computer site, the combination comprising (A) a digital computer having a clock, control unit, arithmetic unit, system bus, instruction memory, data memory and address trunk, (B) said computer further including and being characterized by
  (1) a machine-language console and console interface comprising
    (a) a plurality of switches each corresponding to one bit in a multibit word, and
    (b) means for producing on a plurality of conductors a set of signals unique to each switch when it is actuated, (C) said computer with its instruction memory and interface constituting
  (1) means responsive to the signals on said conductors when each switch is actuated for setting the corresponding bit location of a previously cleared first register, thereby to enter any multibit word into the latter, (D) means at said base for transmitting a succession of time-spaced groups of time-spaced pulses, with each group representing a word, and the presence or absence of a pulse at each time location within a group representing a 1 value at a corresponding bit place within the word, (E) means at the computer site and responsive to the received groups of pulses, including
  (1) means responsive to each pulse within a group for applying to said plurality of conductors a set of signals tantamount to actuation of that one of said switches which corresponds to the bit location of the pulse within a group, and (F) means constituted by said computer with its instruction memory for transferring the contents of said first register to successively higher memory address locations after each group of pulses has been received by said means (E).

21. In a system for sending data or instruction words into a computer from a base remote from the computer site, the combination comprising (A) a digital computer including a clock, control unit, arithmetic unit, system bus, instruction memory, data memory and address trunk, (B) said computer further including and being characterized by
  (1) a machine-language console and console interface for entering information in machine language, said console and interface comprising
    (a) a plurality of switches for entry of signals sequentially one bit at a time, (C) said computer with its instruction memory and interface constituting
  (1) means responsive to signals from said switches for setting up any desired binary word in a first register,
  (2) means responsive to signals from a second register for transferring the contents of said first register into a memory address location represented by the contents of the second register, (D) means at said base for transmitting over a communication link to said computer site a succession of pulse groups, with each group representing a word and with one or the other of two levels at each time location within a group so as to represent 1 or 0 bit values for each bit place within the word, (E) means at the computer site for receiving each pulse group and producing successive signals or sets of signals for each 1 value in a bit place, each bit place corresponding to one of said switches and the signal or sets of signals resulting from a 1 level in any bit place being unique in relation to the others, (F) means responsive to the signals or sets of signals from said means (E) for setting up in said first register the binary word represented by a pulse group received at said means (E), (G) means responsive to and after completion of receipt in said first register of a binary word corresponding to a first pulse group for transferring the first group word contents from said first register to said second register, and (H) means operative after each second and subsequent pulse group word is set up in said first register for (i) activating said means (C)(2) and (ii) incrementally changing the contents of said second register.

22. In a system for entering information into and taking information from a digital computer by transmission of serial pulse trains between the computer site and a distant home base, the combination comprising (A) a digital computer including a clock, control unit, arithmetic unit, system bus, and memory.

(B) said computer further including and being characterized by
  (1) a machine-language console and console interface with first and second connections therebetween for (a) sending input signals from the console to the interface and thence to the computer and for (b) sending output signals from the interface to the console for display purposes, (C) a microcomputer having output and input memory lines coupled to said respective ones of said first and second connections, pulse train input and output connectors, and a stored instruction program (i) to produce at said output connector a first train of pulses which in binary content corresponds to the output signals sent from said interface to said console and appearing on said second connection, and (ii) to produce at said output memory lines, and as input signals on said first connection, sets of signals which correspond in binary content to a second train of pulses on said input connector, (D) a communication link connected to said input and output connectors to transmit said first train of pulses from said output connector to said home base, and to transmit a second train of pulses from home base to said input connector, (E) selectively actuatable means at said home base to supply to said link (D) second trains of pulses containing desired information, and (F) means at said home base responsive to a first train of pulses received over said communications link.

23. The combination set forth in claim 22 further characterized in that
    (a) said means (E) and (F) include a reflective console which is a counterpart of said computer console, and further comprising
    (b) means at said home base for response to a first train of pulses for establishing on said reflective console the same display as that produced on said computer console by output signals which form the content of the received first train, and
    (c) means at said home base for producing at said reflective console input signals like those produceable by the computer console, and for creating a second train of pulses which corresponds in informational content to the input signals from the reflective console.

24. In a system for entering information into and taking information from a digital computer by intelligence transmission over two channels between the computer site and a distant home base, the combination comprising
    (A) a computer including memory for instruction and data words, a control unit, an arithmetic unit, a system bus, and a machine-language console; said console having
        (1) a plurality of switches for manual entry of instruction, data, or address words in binary machine language,
        (2) a plurality of indicators excitable to display a word in binary machine language,
    (B) said computer further including and being characterized by
        (1) a console interface,
        (2) a first set of conductors extending from said switches to the console interface,
        (3) a second set of conductors extending from the console interface to said indicators,
        (4) means responsive to actuation of said switches for inputting signals over said first conductors to the interface and thence to the computer, and
        (5) means for outputting signals over said second conductors to display on said indicators selected words existing within the computer,
    (C) a microcomputer having
        (1) output lines of writable memory tapped into said first set of conductors,
        (2) input lines of readable memory tapped into said second set of conductors,
        (3) an asynchronous pulse receiver-transmitter connected as readable and writable memory and adapted to receive and transmit time-spaced input and output pulse trains, and
        (4) a stored instruction program iteratively executed when the minicomputer is turned on to convert received pulse trains into corresponding word signals on said output lines of memory and to convert input signals on said input lines of memory into corresponding output pulse trains,
    (D) selectively actuatable means at said home base to send pulse trains containing desired information to the receiver portion of said receiver-transmitter (C)(3),
    (E) means at said home base to receive and respond to pulse trains sent by the transmitter portion of said receiver-transmitter (C)(3).

25. The combination set forth in claim 24 further characterized in that said means (D) includes a reflective console having a plurality of switches corresponding respectively to said switches (B)(2) and selectively actuatable to actuate said means (D).

26. The combination set forth in claim 24 further characterized in that said means (E) includes a reflective console having a plurality of indicators corresponding respectively to said indicators (A)(2), together with means responsive to pulse trains sent by the transmitter portion of said receiver-transmitter (C)(3) for actuating the last-named indicators to display in machine language the content of a received pulse train.

* * * * *